US009320972B2

(12) United States Patent
Tanaka et al.

(10) Patent No.: US 9,320,972 B2
(45) Date of Patent: Apr. 26, 2016

(54) WIRELESS COMMUNICATION GAME SYSTEM

(71) Applicant: Nintendo Co., Ltd., Kyoto (JP)

(72) Inventors: Shoya Tanaka, Kyoto (JP); Masato Kuwahara, Kyoto (JP); Toru Oe, Kyoto (JP); Teruyuki Yoshioka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/830,762

(22) Filed: Mar. 14, 2013

(65) Prior Publication Data

US 2013/0203505 A1 Aug. 8, 2013

Related U.S. Application Data

(63) Continuation of application No. 12/926,381, filed on Nov. 15, 2010, now Pat. No. 8,442,436, which is a continuation of application No. 10/689,073, filed on Oct. 21, 2003, now Pat. No. 7,929,911.

(30) Foreign Application Priority Data

Oct. 21, 2002 (JP) .................................. 2002-305523

(51) Int. Cl.
*A63F 9/24* (2006.01)
*A63F 13/30* (2014.01)
*A63F 13/00* (2014.01)

(52) U.S. Cl.
CPC ................. *A63F 13/12* (2013.01); *A63F 13/00* (2013.01); *A63F 2300/402* (2013.01); *A63F 2300/406* (2013.01)

(58) Field of Classification Search
CPC .... A63F 13/12; A63F 13/00; A63F 2300/402
USPC .......................................................... 463/42
See application file for complete search history.

(56) References Cited

U.S. PATENT DOCUMENTS 4,546,351 A 10/1985 Nambu
5,048,831 A 9/1991 Sides
(Continued)

FOREIGN PATENT DOCUMENTS

EP 1 145 748 10/2001
JP 4-359176 12/1992
(Continued)

OTHER PUBLICATIONS

V Jumpbooks Game Series for GBA YUU*GI*OU Duel Monsters International World-wide edition, Shueisha Inc., Apr. 23, 2003, first version, lower port of p. 20, 1 page.
(Continued)

*Primary Examiner* — Reginald Renwick
(74) *Attorney, Agent, or Firm* — Nixon & Vanderhye PC

(57) ABSTRACT

A wireless communication game system includes a plurality of mobile game apparatuses, which function as a parent device or a child device and are capable of making a communication with each other, and broadcasts from the parent device a parent device packet including a parent device PID, a user name UserName, a game name GameName, an OC flag, an E slot, a U slot, and a payload. All the parent device packets are received from the parent device existing within a communicationable range of a user's own apparatus, and the user's own apparatus creates a parent device list, and displays the parent device list on an LCD. Therefore, a user or a player of his own apparatus looks at the game name of the parent device list, for example, and operates a cross key included in an operation key so as to select one desired parent device. Then, transmitting a child device number CID of the user's own apparatus at the E slot designated by the parent device packet, the user's own apparatus transmits a connection request to the parent device.

43 Claims, 27 Drawing Sheets

(56) References Cited

U.S. PATENT DOCUMENTS

| | | | |
|---|---|---|---|
| 5,364,108 A | 11/1994 | Esnouf | |
| 5,428,528 A | 6/1995 | Takenouchi et al. | |
| 5,461,608 A | 10/1995 | Yoshiyama | |
| 5,594,720 A | 1/1997 | Papadopoulos et al. | |
| 5,719,859 A | 2/1998 | Kobayashi et al. | |
| 5,738,583 A | 4/1998 | Comas et al. | |
| 5,987,376 A | 11/1999 | Olson et al. | |
| 6,045,447 A | 4/2000 | Yoshizawa et al. | |
| 6,175,854 B1 | 1/2001 | Bretscher | |
| 6,183,367 B1 | 2/2001 | Kaji et al. | |
| 6,322,451 B1 | 11/2001 | Miura | |
| 6,354,946 B1 | 3/2002 | Finn | |
| 6,383,075 B1 | 5/2002 | Jeong et al. | |
| 6,524,189 B1 * | 2/2003 | Rautila | 463/40 |
| 6,699,125 B2 | 3/2004 | Kirmse et al. | |
| 6,733,382 B2 | 5/2004 | Oe et al. | |
| 6,736,727 B1 | 5/2004 | Doi et al. | |
| 6,769,915 B2 | 8/2004 | Murgia et al. | |
| 6,785,561 B1 | 8/2004 | Kim | |
| 6,804,542 B1 | 10/2004 | Haartsen | |
| 6,842,460 B1 * | 1/2005 | Olkkonen et al. | 370/465 |
| 6,879,570 B1 | 4/2005 | Choi | |
| 6,970,448 B1 | 11/2005 | Sparrell et al. | |
| 7,136,663 B2 | 11/2006 | Metais et al. | |
| 7,177,911 B2 | 2/2007 | DeCarmo | |
| 7,491,124 B2 | 2/2009 | Tanaka et al. | |
| 7,729,661 B2 | 6/2010 | Tanaka et al. | |
| 7,756,129 B2 | 7/2010 | Donaghey | |
| 7,780,526 B2 | 8/2010 | Nguyen et al. | |
| 7,929,911 B2 | 4/2011 | Tanaka et al. | |
| 8,073,923 B2 | 12/2011 | Sasaki et al. | |
| 8,296,439 B2 | 10/2012 | Tanaka et al. | |
| 8,582,570 B2 | 11/2013 | Donaghey | |
| 8,582,571 B2 | 11/2013 | Donaghey | |
| 8,588,196 B2 | 11/2013 | Donaghey | |
| 8,588,231 B2 | 11/2013 | Donaghey | |
| 8,589,599 B1 | 11/2013 | Donaghey | |
| 8,675,590 B2 | 3/2014 | Donaghey | |
| 8,683,092 B1 | 3/2014 | Donaghey | |
| 8,700,815 B2 | 4/2014 | Donaghey | |
| 8,732,347 B2 | 5/2014 | Donaghey | |
| 8,732,361 B2 | 5/2014 | Donaghey | |
| 2001/0008852 A1 | 7/2001 | Izumi | |
| 2001/0012757 A1 | 8/2001 | Boyle | |
| 2001/0029166 A1 | 10/2001 | Rune et al. | |
| 2001/0039212 A1 | 11/2001 | Sawano et al. | |
| 2001/0047452 A1 | 11/2001 | Okada et al. | |
| 2001/0053691 A1 | 12/2001 | Harma | |
| 2002/0002074 A1 | 1/2002 | White et al. | |
| 2002/0061743 A1 | 5/2002 | Hutcheson et al. | |
| 2002/0119821 A1 | 8/2002 | Sen et al. | |
| 2002/0160838 A1 | 10/2002 | Kim | |
| 2003/0003994 A1 | 1/2003 | Washio | |
| 2003/0008714 A1 | 1/2003 | Tajiri et al. | |
| 2003/0040347 A1 | 2/2003 | Roach et al. | |
| 2003/0045356 A1 * | 3/2003 | Thomas | 463/41 |
| 2003/0060168 A1 | 3/2003 | Teibel | |
| 2003/0079003 A1 | 4/2003 | Burr et al. | |
| 2003/0114224 A1 | 6/2003 | Anttila et al. | |
| 2003/0124979 A1 | 7/2003 | Tanada et al. | |
| 2004/0063498 A1 | 4/2004 | Oakes et al. | |
| 2004/0082383 A1 | 4/2004 | Muncaster et al. | |
| 2004/0087369 A1 | 5/2004 | Tanaka et al. | |
| 2004/0128319 A1 | 7/2004 | Davis et al. | |
| 2004/0203354 A1 | 10/2004 | Yue | |
| 2005/0073522 A1 | 4/2005 | Aholainen et al. | |
| 2005/0080896 A1 | 4/2005 | Wu | |
| 2005/0192099 A1 | 9/2005 | Nguyen et al. | |
| 2005/0282639 A1 | 12/2005 | Tanaka et al. | |
| 2007/0197298 A1 | 8/2007 | Rowe | |
| 2008/0171601 A1 | 7/2008 | Kirmse et al. | |
| 2009/0093310 A1 | 4/2009 | Tanaka et al. | |
| 2011/0070950 A1 | 3/2011 | Tanaka et al. | |
| 2011/0281655 A1 | 11/2011 | Nguyen et al. | |

FOREIGN PATENT DOCUMENTS

| | | |
|---|---|---|
| JP | 07-056497 | 3/1995 |
| JP | 07-095321 | 4/1995 |
| JP | 10-015245 | 1/1998 |
| JP | 10-056417 | 2/1998 |
| JP | 10-151274 | 6/1998 |
| JP | 2867980 | 12/1998 |
| JP | 11-033230 | 2/1999 |
| JP | 2924828 | 5/1999 |
| JP | 11-207031 | 8/1999 |
| JP | 11-355867 | 12/1999 |
| JP | 2000-126455 | 5/2000 |
| JP | 2000-135380 | 5/2000 |
| JP | 2000-151641 | 5/2000 |
| JP | 2000-181822 | 6/2000 |
| JP | 2001-038042 | 2/2001 |
| JP | 2001-087561 | 4/2001 |
| JP | 2001-167036 | 6/2001 |
| JP | 2001-168873 | 6/2001 |
| JP | 2001-212365 | 8/2001 |
| JP | 2002-052253 | 2/2002 |
| JP | 2002-066143 | 3/2002 |
| JP | 2002-165009 | 6/2002 |
| JP | 2002-175234 | 6/2002 |
| JP | 2002-189663 | 7/2002 |
| JP | 2002-224449 | 8/2002 |
| JP | 2002-245269 | 8/2002 |
| JP | 2003-023661 | 1/2003 |
| JP | 2003-024643 | 1/2003 |
| JP | 3421017 | 4/2003 |
| JP | 2004-080400 | 3/2004 |
| JP | 2004-136009 | 5/2004 |
| WO | 93/23125 | 11/1993 |

OTHER PUBLICATIONS

Japanese Office Action for Japanese Serial No. 2004-096954.

Office Action issued in corresponding Japanese Patent Application No. 2010-200497 on Oct. 18, 2011.

Claudia V. Goldman et al., "E-Play," Multimedia and Expo, 2002, ICME '02, Proceedings, 2002 IEEE International Conference, vol. 2, pp. 321-324.

Robert N. Smith et al., "An Adaptive Mobile Wireless Handover," Computer Software and Applications Conference, 1997, COMPSAC '97, Proceedings, The Twenty-First Annual International, pp. 486-492, Aug. 11, 1997.

Ricky A. Bangun et al., "A Network Architecture for Multiuser Networked Games on Demand," Information, Communications and Signal Processing, 1997 ICICS, Proceedings of 1997 International Conference, vol. 3, pp. 1815-1819, Sep. 9, 1997.

Ricky A. Bangun et al., "An Analysis of Multi-Player Network Games Traffic," Multimedia Signal Processing, 1999 IEEE 3rd Workshop, pp. 3-8, 1999.

Bluetooth Specification vl.OB, Dec. 1, 1099, pp. 104-107.

Hongjun Zhang et al., "A Variable Slot Length TDMA Protocol for Personal Communication Systems," University of Alberta, Department of Computing Science, Apr. 7, 2002, pp. 1-30. http://www.olsonet.com/pg/PAPERS/tdma.pdf.

Summons to Attend Oral Proceedings issued on Jul. 8, 2014 in European Application No. 4 252 428, pp. 1-13.

Sharp Electronics: "Sharp Model YO-500/YO-530—Electronic Organizer Operation Manual," Jan. 15, 2003, pp. 1-136, XP-002635507.

Specification of the Bluetooth System, Specification vol. 1, Version 1.1, Feb. 22, 2001, pp. 1-1084.

"Master Table of Contents & Compliance Requirements," Specification of the Bluetooth System Wireless Connections Made Easy, Specification vol. 0, Covered Core Package Version: 1.2, Nov. 5, 2003, pp. 1-1200.

"Master Table of Contents & Compliance Requirements," Specification of the Bluetooth System Wireless Connections Made Easy,

(56) References Cited

OTHER PUBLICATIONS

Specification vol. 0, Covered Core Package Version: 2.0 + EDR, Nov. 4, 2004, pp. 1-1230.
"Master Table of Contents & Compliance Requirements," Specification of the Bluetooth System Wireless Connections Made Easy, Specification vol. 0, Covered Core Package Version: 2.1 + EDR, Jul. 26, 2007, pp. 1-1420.
Specification of the Bluetooth System Wireless Connections Made Easy, Specification vol. 1, Covered Core Package Version: 1.0 B, Dec. 1, 1999, pp. 1-1082.
Specification of the Bluetooth System, The Ad Hoc Scatternet for Affordable and Highly Functional Wireless Connectivity, Specification vol. 1, Covered Core Package Version: 1.0, Jul. 5, 1999, pp. 1-1082.

* cited by examiner

FIG. 7

```
SELECT PARENT DEVICE YOU WANT TO CONNECT, AND DEPRESS A BUTTON.
IF YOU WANT TO BE PARENT DEVICE, DEPRESS B BUTTON.

**** PARENT DEVICE LIST ****

<UserName>          <GameName>
    1.  TAROH               MarioKart-2
    2.  ICHIROH             F-Zero
    3.  JIROH               F-Zero       O
    4.  SHIROH              Golf
```

FIG. 8

```
SELECT PARENT DEVICE YOU WANT TO CONNECT, AND DEPRESS A BUTTON.
IF YOU WANT TO BE PARENT DEVICE, DEPRESS B BUTTON.

**** PARENT DEVICE LIST ****

<UserName>          <GameName>
 ▶  1.  TAROH               MarioKart-2
    2.  JIROH               F-Zero
    3.  SHIROH              Golf
```

FIG. 11

| sync | PID | User Name | Game Name | OC | ESlot | USlot | Payload |

FIG. 12

| USlot | | | |
|---|---|---|---|
| CID OF CHILD DEVICE HAVING CHILD DEVICE SLOT 0 BEING ALLOTTED | CID OF CHILD DEVICE HAVING CHILD DEVICE SLOT 1 BEING ALLOTTED | CID OF CHILD DEVICE HAVING CHILD DEVICE SLOT 2 BEING ALLOTTED | CID OF CHILD DEVICE HAVING CHILD DEVICE SLOT 3 BEING ALLOTTED |

FIG. 13

| CID | Payload |

WIRELESS COMMUNICATION GAME SYSTEM

CROSS-REFERENCE TO RELATED APPLICATIONS

This application is a continuation of U.S. patent application Ser. No. 12/926,381 filed Nov. 15, 2010, which is a continuation of Ser. No. 10/689,073 filed Oct. 21, 2003, now U.S. Pat. No. 7,929,911 issued Apr. 19, 2011, which claims priority to Japanese Patent Application No. 2002-305523 filed Oct. 21, 2002. The entire contents of these are incorporated herein in their entirety by reference.

FIELD

The present invention relates to a game system utilizing wireless communication. More specifically, the present invention relates to a wireless communication game system having a "child" device capable of storing information of a parent device existing within a communicable range between the child device, and a mobile game apparatus and a game system used therefor.

BACKGROUND AND SUMMARY

One example of a conventional wireless communication game system is disclosed, for example, in Japanese Patent Laying-open No. 2000-135380 (International Classification: A63F13/00, H04L12/28) laid-open on May, 16, 2000.

In this prior art reference, people such as friends, and others, promise among themselves, for example, that they will bring a game apparatus that executes the same game, establish communication via the game apparatus, and execute a wireless communication game. In the prior art, users have no choice but to confirm verbally identification information of the game apparatus of others and information on a game name, etc., in order to know such information. Therefore, in a case where a game apparatus of unknown persons exists within a communicable range, it is realistically difficult to play the wireless communication game with that person. Therefore, in the prior art, the user cannot freely and dynamically select the game apparatus of a communicating partner.

Therefore, it is a feature of the exemplary embodiments of the present invention to provide a novel wireless communication game system, a mobile game apparatus, a child device connecting method, and a game program in a wireless communication game system.

It is another feature of an exemplary embodiment of the present invention to provide a wireless communication game system, a mobile game apparatus, a child device connecting method, a game program in a wireless communication game system capable of arbitrarily selecting a parent device which a child device intends to select.

It is still another feature of an exemplary embodiment of the present invention to provide a wireless communication game system, a mobile game apparatus, a child device connecting method and a game program in a wireless communication game system capable of freely playing a wireless communication game with the game apparatus existing within a communicable range.

A wireless communication game system according to of an exemplary embodiment of the present invention uses a plurality of mobile game apparatuses, which function as a parent device or a child device and are capable of wireless communication with each other. The parent device includes broadcasting circuitry for broadcasting a parent device packet including user's own apparatus identifying information for allowing a user's own apparatus to be identified and game identifying information for allowing a game executed by the user's own apparatus to be identified. The child device includes a receiver, a display, a selector, and a connection request transmitter. The receiver receives the parent device packet from the parent device existing within a communicable range. The display displays a parent device list of the parent device existing within a communicable range, based on the parent device packet received by the receiver. The selector allows a player to select any one of the parent devices included in the parent device list. The connection request transmitter transmits a connection request toward the parent device selected by the selector.

More specifically, the wireless communication game system is formed using at least two mobile game apparatuses (10: corresponding reference numeral in the detailed description of the preferred embodiments described below in this embodiment. A mobile game apparatus (10) in the embodiment includes a mobile game machine (12), and a wireless communication unit (14) attached to the mobile game machine. In a case of the parent device, the mobile game apparatus uses this mobile communication unit (14) so as to broadcast a parent device packet in a first time slot, and receives a child device packet in a second time slot. In a case of the child device, the mobile game apparatus receives the parent device packet in the first time slot, and transmits the child device packet toward the parent device in the second time slot.

The broadcasting circuitry corresponds to steps S2003 and S2009 of a transmission/reception process of the parent device shown in FIG. 29 in the embodiment, and broadcasts the parent device packet including a parent device number PID as the user's own apparatus identifying information, and a game name GameName as game identifying information.

In addition, the child device receives the above-described parent device packet by the receiver shown in a step S4001 in FIG. 32 of the embodiment. Based on this parent device packet, in a step S15 in FIG. 20, for example, the parent device list is created, and in a step S23 or a step S25 in FIG. 20, the parent device list is displayed on an LCD (18).

A user of the child device looks at a game name in the parent device list, for example, and operates a cross key of an operation key (38) forming a selector in steps of S79 and S151 in FIG. 21 so as to select one desired parent device from the parent device list. Then, a step S83 in FIG. 24, that is, a connecting process of the child device in FIG. 30 and FIG. 31 is executed. By means of a connection request transmitter that corresponds to a step S3023 (FIG. 31) transmitting a child device number CID of the user's own apparatus to an E slot, the connection request is transmitted toward the parent device.

Therefore, this allows the child device to arbitrarily determine whether to connect to any one of the parent devices displayed in the parent device list created from the parent device packet.

In a certain embodiment, the broadcasting circuitry broadcasts the parent device packet even during a time that a communication game is being executed with another child device. This, more specifically, corresponds to FIG. 29, and the child device is capable of obtaining information (PID, game name, and etc.) in the parent device executing the wireless communication game. This allows the child device to know the existence of the parent device associated with the child device that intends to make a new participation, for example, so that it is possible to participate in the middle of the game play.

In another embodiment, the parent device and the child device are apparatus for making a wireless communication in a predetermined communication cycle. The communication cycle includes a first time slot used by the parent device, and a second time slot used by the child device. The broadcasting circuitry transmits the parent device packet including game data in the first time slot. That is, the first time slot is a parent device slot, and the second time slot is a child device slot. Furthermore, the broadcasting circuitry broadcasts the parent device packet including payload data shown in FIG. 11 (step S2003). Therefore, the parent device always broadcasts the parent device packet, thus the child device is capable of obtaining the latest information on all parent devices existing within a communicable range.

In a certain embodiment, the display displays in the parent device list only the parent device that executes a game communicable with the game executed by the user's own apparatus, based on the game identifying information received by the receiver. In a case that the game apparatus is an apparatus to which a game cartridge storing a game program is detachably attached, for example, the display displays in the parent device list the parent device only when the game of the game cartridge attached to the parent device is communicable with the game of the game cartridge attached to the child device. More specifically, as shown in FIG. 4, only the parent device capable of executing the game communicable with the user's own apparatus is displayed in the parent device list. Therefore, by means of a display of the parent device executing a game not communicable with the user's own apparatus being omitted, it becomes easy for a player of the child device to select the parent device.

In another embodiment, the child device is an apparatus to which a game cartridge storing a game program is detachably attached. The display displays in the parent device list a parent device that executes a game not communicable with the game of the game cartridge currently attached thereto. More specifically, the game cartridge corresponds to a cartridge 16 shown in FIG. 1, and the cartridge 16 stores a game program within a ROM 42. Therefore, the game program cannot execute other game programs. However, even in a case that the cartridge currently attached is a cartridge not communicable with the parent device, it becomes communicable if changed to another cartridge. Thus, by displaying the parent device currently not communicable, it becomes possible to encourage to change the cartridge.

In still another embodiment, the parent device packet further includes entry reception data showing whether or not to receive a new entry of the child device. The display displays in the parent device list only the parent device that receives the new entry of the child device, based on the entry reception data received by the receiver. More specifically, the entry reception data corresponds to data other than "ffh" of the E slot, and therefore, the child device displays the parent device that sets the data other than "ffh" in the E slot of the parent device packet as shown in FIG. 3 in a step S23 or S25 (FIG. 20). Therefore, by displaying only the parent device that receives the new entry of the child device, wasted information (information on the parent device not communicable) of the parent device is omitted, thus allowing a player of the child device to easily select the parent device.

In yet another embodiment, the parent device further comprises a child device-use program storage locations for storing a child device-use program, and a child device-use program transmitter for transmitting, in response to a connection request from the child device (the child device is an apparatus to which the game cartridge is detachably attached, for example, and in response to a request from the child device to which the game cartridge is not attached), the child device-use program to the child device. The parent device packet further includes child device-use program holding data showing whether or not it is being provided with the child device-use program storage locations. In a case of showing that the child device-use program holding data is provided with the child device-use program, the display displays in the parent device list the parent device irrespective of the game, which is executed by the user's own apparatus, based on the child device-use program holding data received by the receiver. More specifically, the child device-use program storage locations corresponds to an area 76 in FIG. 16, and the child device-use program is transferred from the parent device to the child device in a step S77 in FIG. 19 (receiving process of the child device is a step S145 in FIG. 26). Therefore, the child device activates the child device-use program, and is capable of playing a game in that OC mode. Herein, in this embodiment, the parent device having the child device-use program holding data (in the embodiment, OC flag) "1" is displayed as shown in FIG. 5. That is, the parent device stores not only a user's own apparatus (for the parent device) program but also the child device-use program, and transmits the program to the child device since the child device receives and executes that program, it is not necessary to have a game program on the child device side. In addition, since the child device is capable of knowing the parent device capable of playing the OC-mode-use game, it is possible to easily play the game even if the cartridge is not attached.

In addition, in accordance with an exemplary embodiment, the parent device stores both a first program not requiring the child device to transmit the child device-use program, and a second program requiring the child device to transmit the child device-use program. The parent device packet further includes execution type data showing which program, the first program or the second program, the parent device executes. Regarding the parent device executing the first program, the display displays in the parent device list only the parent device that executes a game communicable with the game executed by the user's own apparatus, based on the execution type data received by the receiver, and regarding the parent device executing the second program, displays in the parent device list irrespective of the game, which is executed by the user's own apparatus. More specifically, a cartridge 16 shown in FIG. 16 is attached to the parent device, and this cartridge stores both the first program (normal mode game program), and the second program (OC mode-use game program), and the execution type data showing which is executing, the first program or the second program, that is, "1" or "0" indicated by an OC flag in the embodiment, is transmitted to the parent device packet. Therefore, regarding the parent device having the OC flag "1", the child device displays only the parent device communicable with the parent device, and regarding the parent device having the OC flag "0", all parent devices are displayed irrespective of the game, which is executed by the user's own apparatus. That is, only the information of the parent device communicable with the parent device or in a state capable of transmitting the child device-use program (second program is being executed) is displayed so that wasted information on the parent device (information on the parent device not communicable, and etc.) is omitted. This allows a player to easily select the parent device.

In an exemplary embodiment, the child device is an apparatus to which a game cartridge storing a game program is detachably attached. The display displays, in a case where the game cartridge is not attached, in the parent device list only the parent device provided with the child device-use program storage locations, based on the child device-use program holding data received by the receiver. Similar to an above-described embodiment, only the parent device holding the OC-mode-use game program is displayed. Therefore, in a case where the game cartridge is not attached, the child device displays only the information on the parent device capable of transmitting the child device-use program. This allows a player using the child device to easily select the parent device.

In still another embodiment, the present invention further comprises: parent device list storage locations for storing a parent device list of the parent device existing within a communicable range, based on the parent device packet received by the receiver; and a parent device list clearing mechanism for regularly clearing the parent device list stored in the parent device list storage locations. The display displays based in the parent device list stored in the parent device list storage locations. More specifically, the parent device list is displayed based on the parent device list storage locations (which corresponds to a parent device list area 80 in FIG. 18), and the parent device list is regularly cleared using a parent device list clear timer 82 (FIG. 18), for example. This excludes the parent device beyond the communicable range, and enables surely informing a user or a player of the only parent device existing within a communicable range of the child device at that time.

A child device connecting method in a wireless communication game system according to an exemplary embodiment of the present invention is a child device connecting method in the wireless communication game system using a plurality of mobile game apparatuses that function as a parent device or a child device capable of communicating with each other, and includes following steps of (a) broadcasting from the parent device a parent device packet including user's own apparatus identifying information for allowing the user's own apparatus to be identified, and game identifying information for allowing a game executed by the user's own apparatus to be identified, (b) receiving in the child device the parent device packet from the parent device existing within a communicable range, (c) displaying in the child device a parent device list of the parent device existing within a communicable range, based on the parent device packet received by the receiving step, (d) allowing in the child device a player to select any one of the parent devices included in the parent device list, and (e) transmitting in the child device a connection request toward the selected parent device.

A program of a wireless communication game system according to an exemplary embodiment of the present invention is a program of a wireless communication game system using a plurality of mobile game apparatuses that function as a parent device or a child device capable of communicating with each other, and allows a processor of the mobile game apparatus to execute following steps: (a) allowing the processor of the parent device to broadcast a parent device packet including user's own apparatus identifying information for identifying the user's own apparatus, and game identifying information for allowing a game executed by the user's own apparatus to be identified, (b) allowing the processor of the child device to receive the parent device packet from the parent device existing within a communicable range, (c) allowing the processor of the child device to display a parent device list of the parent device existing within a communicable range, based on the parent device packet received by the step (b), (d) allowing the processor of the child device to make a player select any one of the parent devices included in the parent device list, and (e) allowing the processor of the child device to transmit a connection request toward the selected parent device.

A mobile game apparatus according to an exemplary embodiment of the present invention uses a plurality of mobile game apparatuses, any one of which functions as a parent device, and the other of which functions as a child device, both capable of playing a wireless communication game. This mobile game apparatus comprises: broadcasting circuitry, for the parent device (for functioning as the parent device), for broadcasting a parent device packet including user's own apparatus identifying information for allowing the user's own apparatus to be identified, and game identifying information for allowing a game executed by the user's own apparatus to be identified; a receiver; a display; a selector; and a transmitter, for the child device (for functioning as the child device). The receiver receives the parent device packet from the parent device existing within a communicable range. The display displays a parent device list of the parent device existing within a communicable range, based on the parent device packet received by the receiver. The selector allows a player to select any one of the parent devices included in the parent device list. The transmitter transmits a connection request toward the selected parent device.

In the child device connecting method, the program, the mobile game apparatus, similar to the wireless communication game system, it has an advantage that the child device is capable of knowing the parent device existing within a communicable range, and easily selecting and connecting a desired parent device.

According to an exemplary embodiment of the present invention, since the parent device broadcasts the parent device information, it is possible that the child device knows what kind of parent devices exist within a communicable range (that is, it is possible to know the parent device capable of playing a communication game). In addition, the child device is capable of arbitrarily determining which parent device to connect.

In a case of a wireless communication game, the mobile game apparatus is freely carried, and therefore, the mobile game apparatus existing within a communicable range progressively changes. According to an exemplary embodiment of the present invention, however, it is possible to know information on the mobile game apparatus existing within a communicable range. This makes it possible to freely determine an intended partner with whom to play the wireless communication game.

In addition, there is a case that an apparatus of a unknown stranger comes into a communicable range. In this case, too, it is possible to know the information, thus making it possible to play the wireless communication game with the unknown stranger.

The above described objects and other objects, features, aspects and advantages of the exemplary embodiments of the present invention will become more apparent from the following detailed description of the present invention when taken in conjunction with the accompanying drawings.

BRIEF DESCRIPTION OF THE DRAWINGS

FIG. 3 is an illustrative view showing an example of a display screen in a case that an all-display flag, which displays information of all parent devices around a user's own apparatus in the FIG. 2 embodiment, is turned on;

FIG. 7 is an illustrative view showing an example of a display screen of the parent device list when a mobile game apparatus having a user's name "Siroh" enters a communication range in the FIG. 6 situation in the FIG. 2 embodiment;

FIG. 8 is an illustrative view showing an example of a display screen of the parent device list when the mobile game apparatus having a user's name "Ichiroh" comes out of the communication range in the FIG. 7 situation in the FIG. 2 embodiment;

FIG. 11 is an illustrative view showing one example of a parent device packet transmitted at a parent device slot in the FIG. 10 embodiment;

FIG. 12 is an illustrative view showing a U slot in detail in FIG. 11;

FIG. 13 is an illustrative view showing one example of a child device packet transmitted at a child device slot in the FIG. 10 embodiment;

DETAILED DESCRIPTION OF THE PREFERRED EMBODIMENTS

Figure 1:
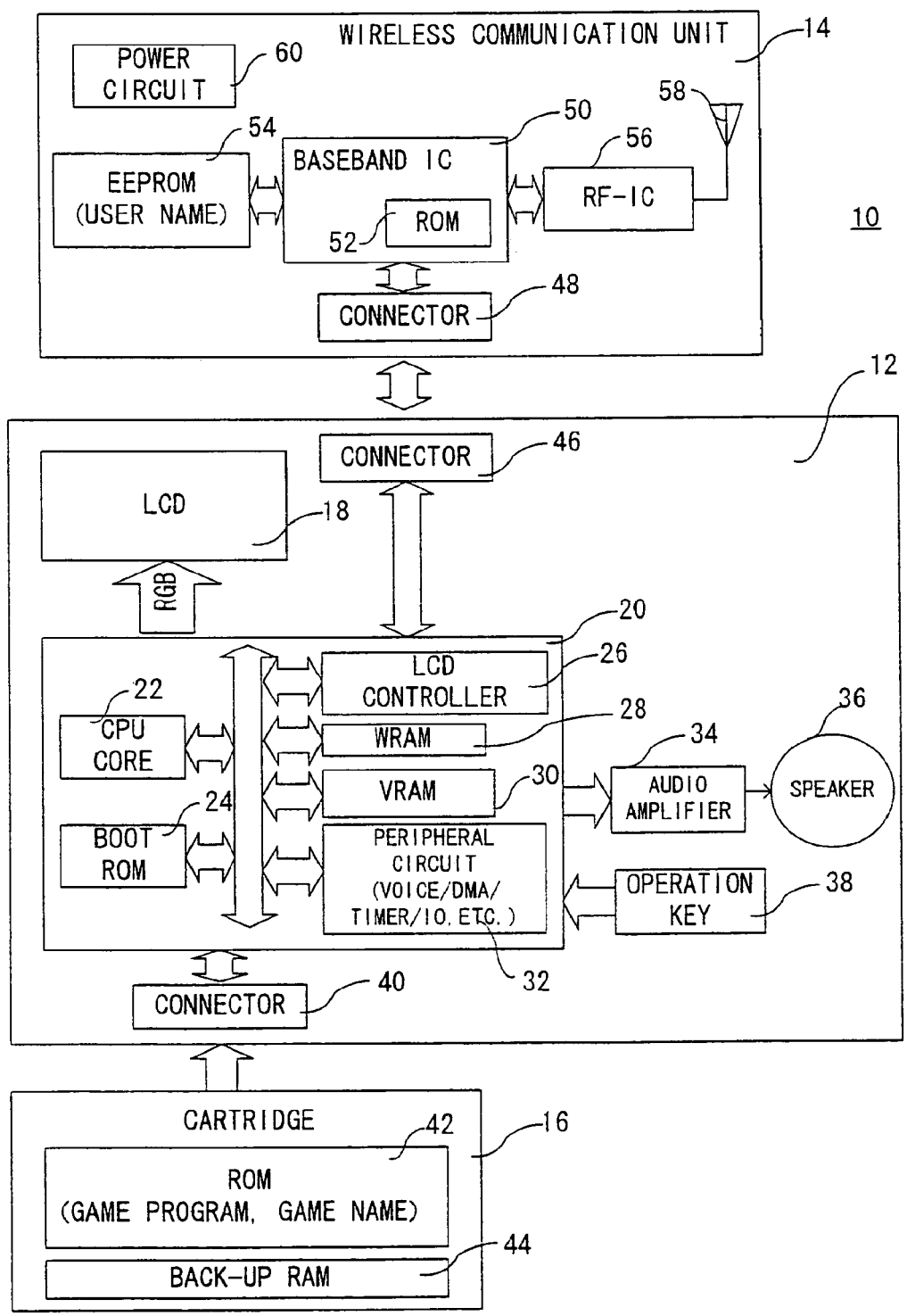
FIG. 1 is a block diagram showing one example of a mobile game apparatus used for a wireless transmission game system of one embodiment of the present invention.

A wireless communication game system to which an exemplary embodiment of the present invention is adapted uses a mobile game apparatus 10 as shown in FIG. 1 as an example. In this embodiment, the mobile game apparatus 10 includes a mobile game machine 12 such as a GameBoy Advance (Trademark), for example, a wireless communication unit 14 connected to a communication connector 46 of the mobile game machine 12, and a cartridge 16 connected to a cartridge connector 40. That is, in this embodiment, the mobile game apparatus 10 is constructed of the mobile game machine 12, the wireless communication unit 14, and the cartridge 16.

The mobile game machine 12 shown in FIG. 1 includes a processor 20, and the processor 20 includes a CPU core 22 and a boot ROM 24 related thereto, an LCD controller 26, a WRAM (working RAM: the same below) 28, a VRAM 30, and a peripheral circuit 32. The peripheral circuit 32 includes a voice (sound) circuit, a DMA (Direct Memory Access) circuit, a timer circuit, an input/output interface (I/O), and etc. In an LCD 18 provided in a front surface of the mobile game machine 12, a displaying signal or an RGB signal in this embodiment is applied from the processor 20, and therefore, a game image is displayed in color on the LCD 18. In addition, an audio signal is applied from the processor 20 to the sound circuit 34, and voices or sound such as a game music and a sound effect is output by the audio signal. Furthermore, by way of example, a cross key and a start key provided sandwiching the LCD 18 in the front surface of the mobile game machine 12, a select key, an A button and a B button are congregated and are represented as operation key/switch 38. Operation signals from the operation switch 38 are input into the processor 20. Therefore, the processor 20 executes a process in accordance with an instruction of a user applied through the operation switch 38.

The mobile game machine 12 has the cartridge connector 40, and the cartridge 16 is connected or inserted into this cartridge connector 40. The cartridge 16 contains a ROM 42 and a backup RAM 44, and a game program for a game to be executed in the mobile game machine 12, in addition to its game name, is set in the ROM 42 in advance. The backup RAM 44 stores progressive data of the game and resultant data of the game.

The mobile game machine 12 is further provided with a communication connector 46, and a connector 48 of the wireless communication unit 14 is connected to the communication connector 46. It is noted that the mobile game machine 12 used in this embodiment is GameBoy Advance (Trademark) as an example. GameBoy Advance is a commercially available hand-held video game platform, which in copending application Ser. No. 09/863,866 (published on Nov. 29, 2001 as US 2001/0047452) which is hereby incorporated herein by reference. In this case, the above-described cartridge connector 40 is a 32-pin connector provided at a far side on an upper surface when the LCD 18 is rendered a front surface (front face), and the communication connector 46 is a 6-pin connector provided at a near side on an upper side.

The wireless communication unit 14 includes a base band IC 50, and the base band IC 50 includes a ROM 52. The ROM 52 contains an OCD (One-Cartridge Download) program, and other programs, for example, and the base band IC 50 is operated according to these programs. It is noted that the One-Cartridge Download program is a program for downloading a program into the child device in an OC mode (one-cartridge mode: a mode in which a game cartridge is attached to the parent device only, and the child device is operated in response to a download of a child device-use program from the parent device cartridge).

The wireless communication unit 14 is further provided with an EEPROM 54, and a user's name, for example, is uniquely set to the EEPROM 54. The base band (Base Band) IC 50 transmits data including the user's name to an RF (Radio Frequency)-IC 56, the RF-IC 56 modulates the data, and transmits a radio wave from an antenna 58. However, in an exemplary embodiment, the an intensity of the radio wave is extremely weak, and is set to so small a value that this wave radio is not subject to legal regulation. In addition, this wireless communication unit 14 is provided with a power circuit 60. Typically, the power circuit 60 is a battery, and supplies a DC (direct-current) power source to each component of the wireless communication unit 14.

In addition, in the wireless communication unit 14, the radio wave transmitted from another mobile game apparatus is received by the antenna 58, demodulated by the RF-IC 56, and a demodulated signal is input into the base band IC 50. Therefore, the base band IC 50 decodes the demodulated signal, decodes the data, and transmits the data to the mobile game machine 12, that is, the WRAM 28 via the connectors 48 and 46.

In the wireless communication game system of an embodiment according to the present invention, a plurality of mobile game units 10 as shown in FIG. 1 are used. A dotted line 64 in FIG. 2 indicates a communicable range of a user's mobile game apparatus 62. In addition, it is probable that the mobile game apparatus 62 can apply for an entry to the mobile game apparatus existing within the communicable range 64. This communicable range 64 is a range capable of performing a data communication between the parent device and the child device by the above-described weak radio wave, and any of a plurality of the mobile game apparatuses existing within the communicable range 64 can arbitrarily become the parent device or the child device. In the example of FIG. 1, four parent devices, three child devices, and one user's own apparatus 62 exist within the range 64.

In addition, in a case that the user's own apparatus 62 participates in a game, the apparatus 62 needs to become the parent device or the child device. In a case that the user's own apparatus becomes the child device, it is necessary to find a parent device capable of participating. When finding the parent device, it is necessary to find a different parent device depending on a case that the user's own apparatus has the cartridge 16.

Figure 2:
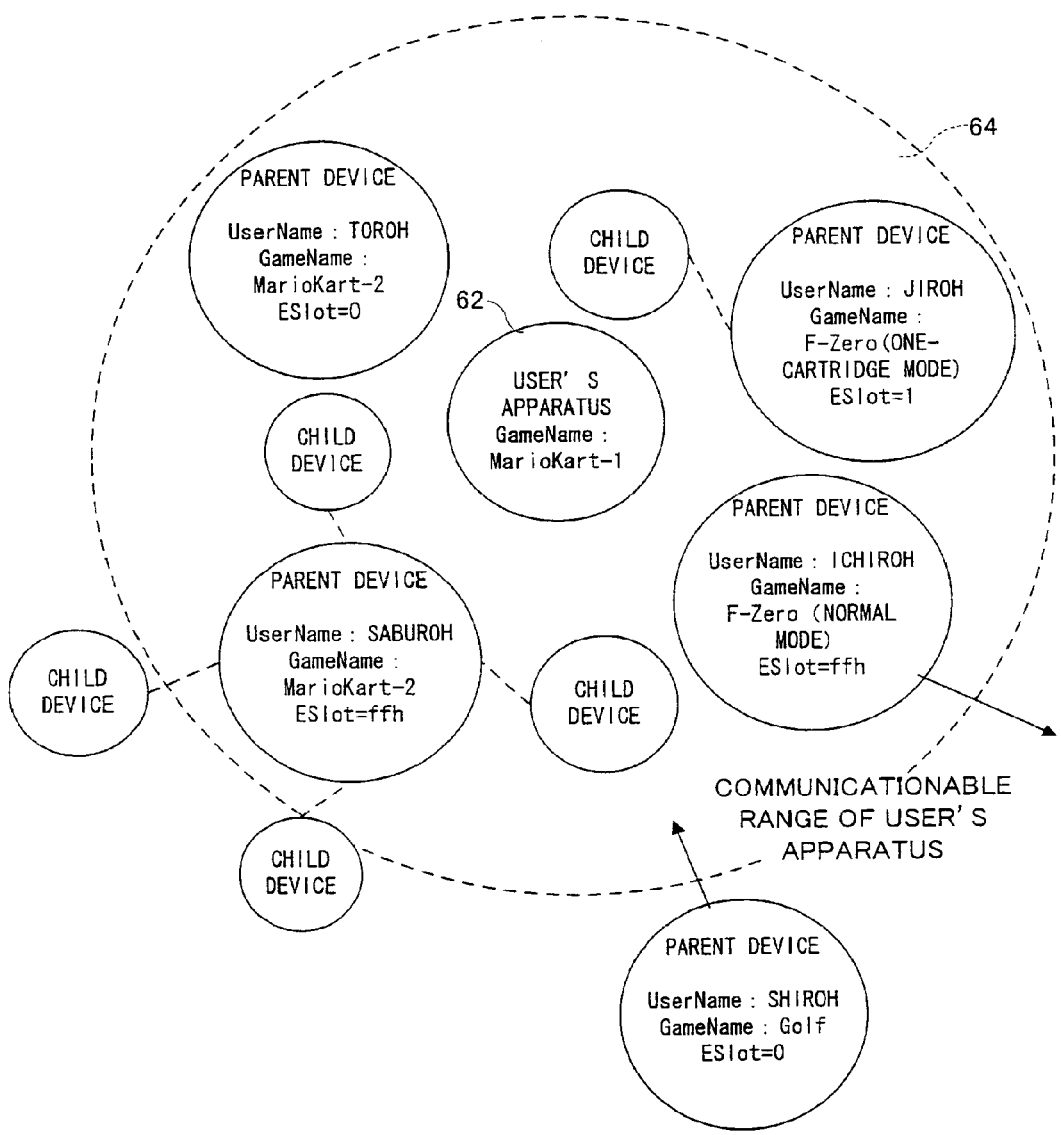
FIG. 2 is an illustrative view for schematically showing a game system using the mobile game apparatus in the FIG. 1 embodiment.
Figure 3:
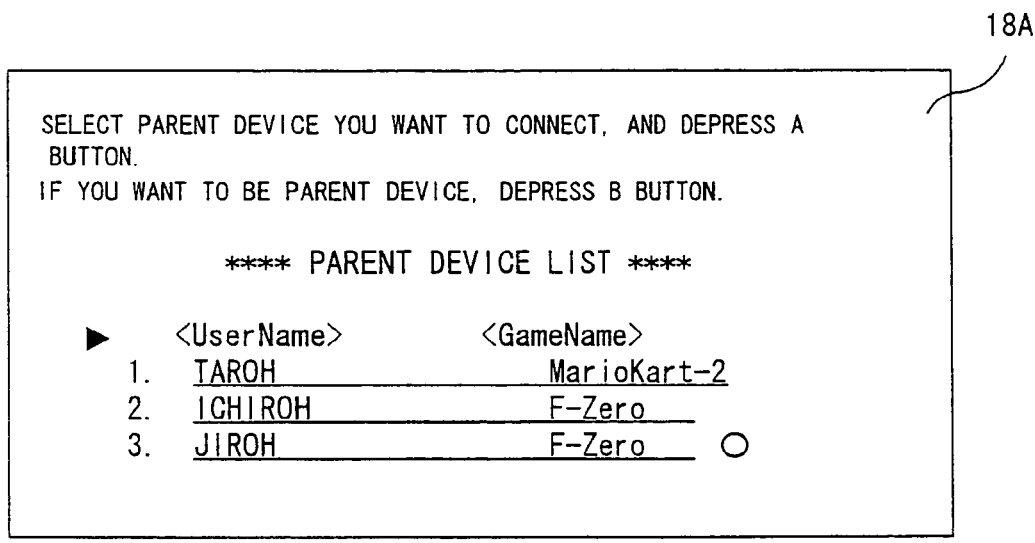

First, in a case that the user's own apparatus 62 is the mobile game apparatus to which the cartridge 16 is attached shown in FIG. 1, and an all-display flag showing to display all parent devices around the user's own apparatus 62 (described later) is set to "1", a parent device list 18A as shown in FIG. 3 is displayed on the LCD 18 of the mobile game machine 12 show in FIG. 1. In the parent device list 18 A in FIG. 3, all parent devices existing within the communicable range 64 (FIG. 2), that is, three parent devices having the user's names as "Taroh", "Ichiroh", and "Jiroh", respectively, are displayed. Therefore, when the user of the user's own apparatus intends to operate or function the user's own apparatus as the child device, the user is capable of selecting the parent device to which the user intends to connect by moving a cursor by the cross key included in the operation key 38 (FIG. 1) so as to specify the parent device, and after this, depressing the A button that is also included in the operation key 38.

However, in a case that it is intended to use the user's own apparatus as the parent device, the user may simply depress a B button included in the operation key 38.

The reason why only the three parent devices are displayed in the parent device list 18A in FIG. 3, in spite of the four parent devices existing within the range 64 in FIG. 2 is that the parent device having the user name "Saburoh" has an entry slot ESlot set to "ffh". The entry slot ESlot is a flag showing whether or not to accept a new child device, and when the entry slot ESlot is set to "ffh", the parent device refuses a new participation of the child device so that such the parent device is not displayed. The parent device having the user name "Saburoh" has reached the maximum number of child devices available for entry, thus not accepting the new child device.

In addition, in the parent device list 18A in FIG. 3, a circle (O) is added to the parent device having the user name "Jiroh". This circle (O) indicates that it is possible to play the game in the OC mode.

Figure 4:
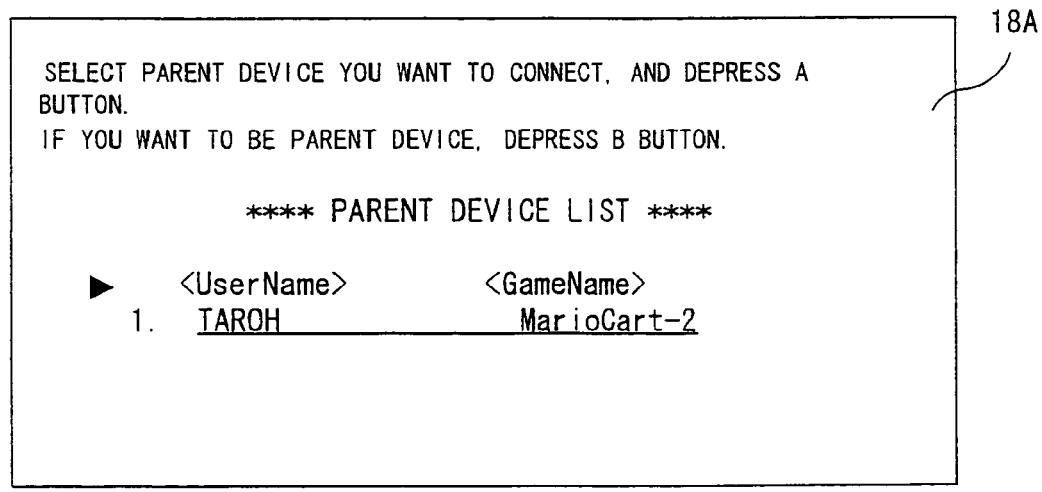
FIG. 4 is an illustrative view showing an example of a display screen showing only the parent device existing around the user's own apparatus and capable of performing a communication game between the user's own apparatus, in a case that the all-display flag is not turned on, in the FIG. 2 embodiment.

Furthermore, when the all-display flag is turned-off, the parent device list 18A shown in FIG. 4 is displayed on the LCD 18. In this case, the game cartridge of the user's own apparatus such as a parent device communicable with Mario Kart-1 (Trademark), for example, that is, only the parent device having the user name "Jiroh" in this example, is displayed. Because a cartridge of Mario Kart-2 (Trademark) is attached to the parent device having the user name "Taroh", and the Mario Kart-1 (Trademark) and the Mario Kart-2 (Trademark) are communicable with each other. It is noted that if there is a parent device to which the cartridge of the Mario Kart-1 (Trademark) is attached within the communicable range 64, that parent device, too, is displayed without question.

In the above-described example, the cartridge of Mario Kart-1 (Trademark) is attached to the user's own apparatus (child device). However, in a case of intending to play the game in the OC mode without the cartridge 16 being attached to the user's own apparatus, a parent device list 18A shown in FIG. 5, for example, is displayed on the LCD 18. In the parent device list 18A in this FIG. 5, only the parent device corresponding to the OC mode, that is, the parent device having the user name "Jiroh", is displayed in this example ("F-ZERO" (Trademark) is a game corresponding to the OC mode). However, the cartridge 16 is not attached to the user's own apparatus in this case, and thus, the user's own apparatus cannot become the parent device. Therefore, a message that says "depress button B if you want to become the parent device" shown in FIG. 3 or FIG. 4 is not displayed.

Figure 6:
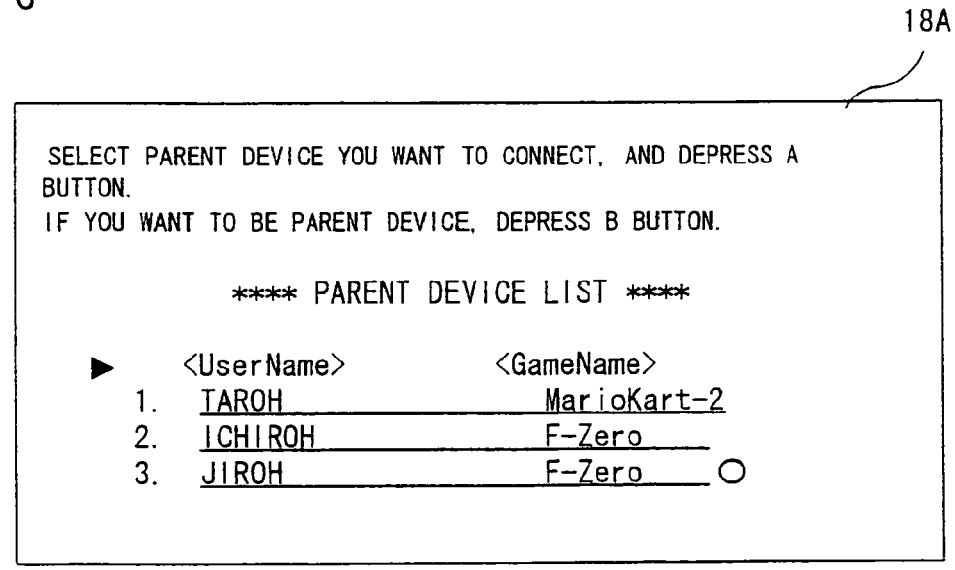
FIG. 6 is an illustrative view showing an example of a display screen of a parent device list in a certain situation in the FIG. 2 embodiment.

Next, referring to FIG. 6-FIG. 8, descriptions will be made regarding a change of the display of the user's own apparatus 62 in a case that the parent device having the user name "Shiroh" enters the communicable range 64 shown in FIG. 2, and later, the parent device having the user name "Ichiroh" comes out of the range 64. In a case that the parent device having the user name "Shiroh" is outside the range, the same parent device list 18A as FIG. 3 is displayed on the LCD 18 of the user's own apparatus as shown in FIG. 6.

Subsequently, when the parent device having the user name "Shiroh" enters the range, a parent device list 18A shown in FIG. 7 is displayed. It is noted that it is assumed that the all-display flag of the user's own apparatus 62 is turned-on. That is, the parent device having the user name "Shiroh" is displayed in addition to the parent devices having the user name "Taroh", "Ichiroh", and "Jiroh", respectively.

Furthermore, when the parent device having the user name "Ichiroh" comes outside the range 64, a parent device list 18A in FIG. 8 is displayed. The parent device having the user name "Ichiroh" is not displayed in this parent device list.

Figure 9:
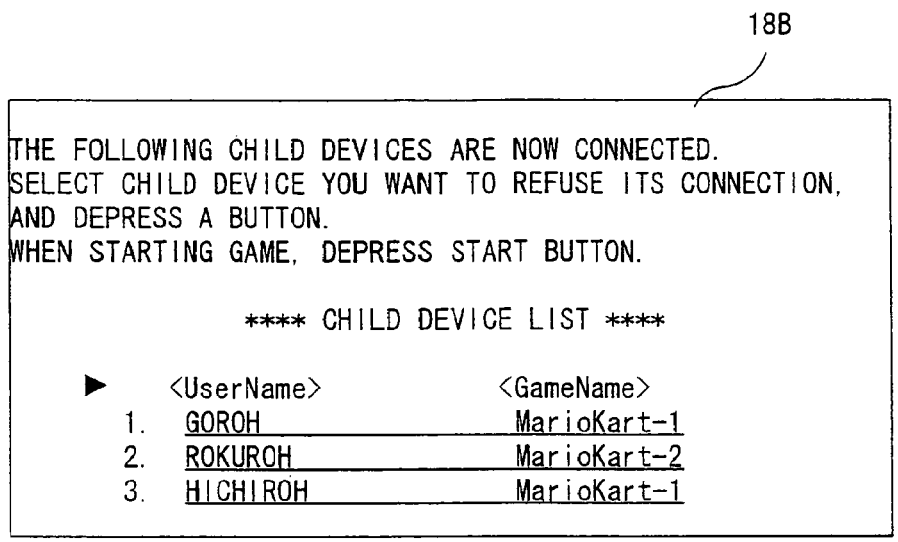
FIG. 9 is an illustrative view showing an example of a display screen of a child device list of a situation in which the user's own apparatus is the parent device, and to wait for a connection (entry) of the child device in the FIG. 2 embodiment.

In addition, in a case that the user's own apparatus is the parent device, and waits for a new participation of the child device, a child device list 18B shown in FIG. 9 is displayed on the LCD 18. Looking at this child device list 18B allows to know that child devices having the user name "Goroh", "Rokuroh", and "Hichiroh", respectively are currently connected to the user's own apparatus. Herein, it is noted that since this embodiment is a wireless communication game system that processes the game by making a wireless communication between the parent device and the child device by a extremely weak radio wave, a term "connect" is not essentially to be used. However, as a term to describe a coordinating state communicable between the mobile game apparatus, which becomes the parent device, and the mobile game apparatus, which becomes the child device, the term "connect" is used for the sake of convenience, by borrowing a term used in a case of a wire communication.

Figure 10:
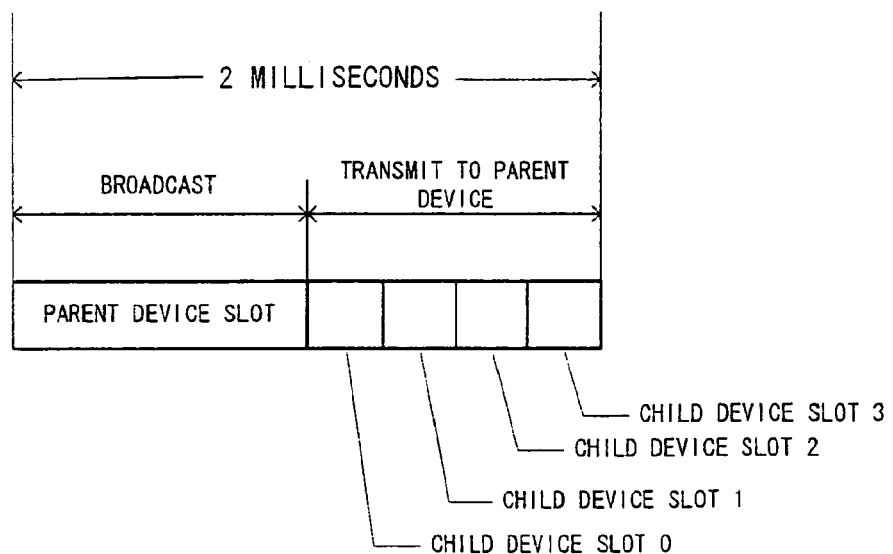
FIG. 10 is an illustrative view showing one example of a data cycle in the FIG. 2 embodiment.

Next, referring to FIG. 10-FIG. 14, descriptions will be made regarding data packet formats in a case that the parent device and the child device, which are in a connecting state, make a wireless communication. As shown in FIG. 10, one data cycle is two milliseconds, and the data cycle includes one parent device slot and a plurality of (in this embodiment, four) child device slots. In the parent device slot, a parent device packet specifically shown in FIG. 11 is broadcast, and in each of the four child device slots, a transmission of the child device packet specifically shown in FIG. 13 to the parent device is performed.

The parent device packet, as shown in FIG. 11, has a field sync for storing synchronizing data at its head, and has a field PID for storing a number (identifying code) PID of the parent device subsequent to that synchronizing data field sync. Subsequent to the field PID, a user name field UserName, and a game name field GameName are formed. In the user name field UserName, a user name read-out from the EEPROM 54 (FIG. 1), which corresponds to "Jiroh", "Ichiroh", and etc. in the above-described example, is registered, and in the game name field GameName, the game name such as the Mario Kart-1 (Trademark), Mario Kart-2 (Trademark), the F-Zero (Trademark), Golf, . . . in the above-described example, are registered. It is noted that if the cartridge 16 (FIG. 1) is attached, a game name (68 in FIG. 16) read-out from the ROM 42 (FIG. 1) may be automatically registered in this game name field GameName.

The parent device packet further includes a flag OC, and this flag OC is a flag showing whether or not possible to be applied to the above-described one cartridge (OC) mode. More specifically, when this flag OC is reset, that is, when OC=0, this means that the game cartridge of the parent device at that time is not applicable to the OC mode, or applicable to the OC mode, however, it is currently played in the normal mode. When the flag OC is set, that is, when OC=1, this means that it is possible to be applicable to the OC mode, and it is currently played in the OC mode. Therefore, a user who does not have the cartridge needs to find the parent device having this flag OC "1".

Subsequent to the flag OC, the parent device packet includes fields ESlot, USlot, and Payload in this order. The E slot field Eslot is stored with the number of the child device slots available for entry (participation). That is, the slot number that a newly participated child device can use is stored. In the U slot field USlot, a usage situation of the child device slot is stored. More specifically, this is shown in FIG. 12. That is, the U slot field USlot includes four areas, and each of four areas corresponds to a child device slot 0, a child device slot 1, a child device slot 2, and a child device slot 3. Then, in each area, the number (identifying code) CID of the child device to which the child device slot is assigned is stored. When the child device number CID corresponding to the area is registered, it is understood that that child device slot is used.

The payload field Payload is a field for transmitting the game data necessary in a game process, and a field for storing the game data transmitted from the parent device to the child device.

A child device packet transmitted from the child device at the child device slot assigned to the child device is displayed in FIG. 13. That is, the child device packet includes a head field CID for storing or registering the child device number CID, and a payload field Payload subsequent thereto. The payload field Payload is a field for storing game data transmitted from the child device to the parent device.

Figure 14:
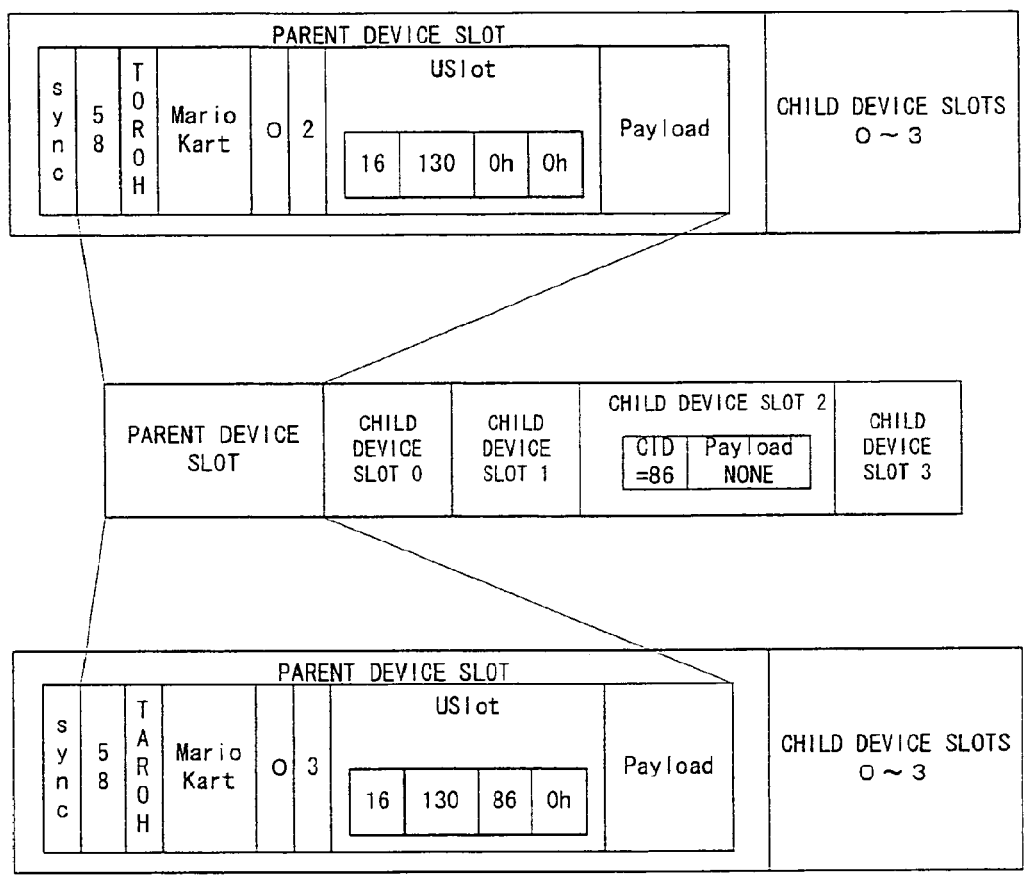
FIG. 14 is an illustrative view showing a specific example of communication data in a certain situation of the FIG. 1 embodiment.

FIG. 14 shows a specific example. In the example of FIG. 14, "58" is stored in the parent device number field PID, and therefore, it is understood that the parent device number PID is "58". In addition, it is understood that the user name of the parent device is "Taroh", the game name is Mario Kart (Trademark), the flag OC is "0", and "2" is registered in the E slot field ESlot. Furthermore, by referring to the U slot field USlot, it is understood that although the child device having the child device number (CID) "16" is connected to the child device slot 0, and the child device having the child device number (CID) "130" to the child device slot 1, respectively, both the child devices 2 and 3 are "0h", thus possible to know that the both are vacant slots.

In a case that a new child device attempts to connect (Entry) to the parent device under such the situation, the child device number is determined by issuing the child device number CID other than "16" or "130" such as a random number, for example, because, by referring to the U slot field USLot of the parent device, "16" and "130" are used as the child device CID. As one example, it is provided that "86" is determined as the CID of the child device. Therefore, the child device transmits CID=86 to the child device slot (child device slot 2) designated by the ESlot.

Then, the parent device knows, by receiving "86" in the child device slot 2, that the child device having the child device number CID "86" intends to apply for entry. Next, the parent device determines whether or not to accept that entry. In a case of accepting the entry, the parent device broadcasts the parent device packet having "86" set to the area corresponding to the child device slot 2 of the Uslot, which is shown in the lowest column in FIG. 14, and signals that a new participation of the child device having the child device number CID "86" is accepted. At the same time, the newly participated child device confirms that CID=86 is present as its own child device number in the area corresponding to the child device slot 2 of the Uslot.

Figure 15:
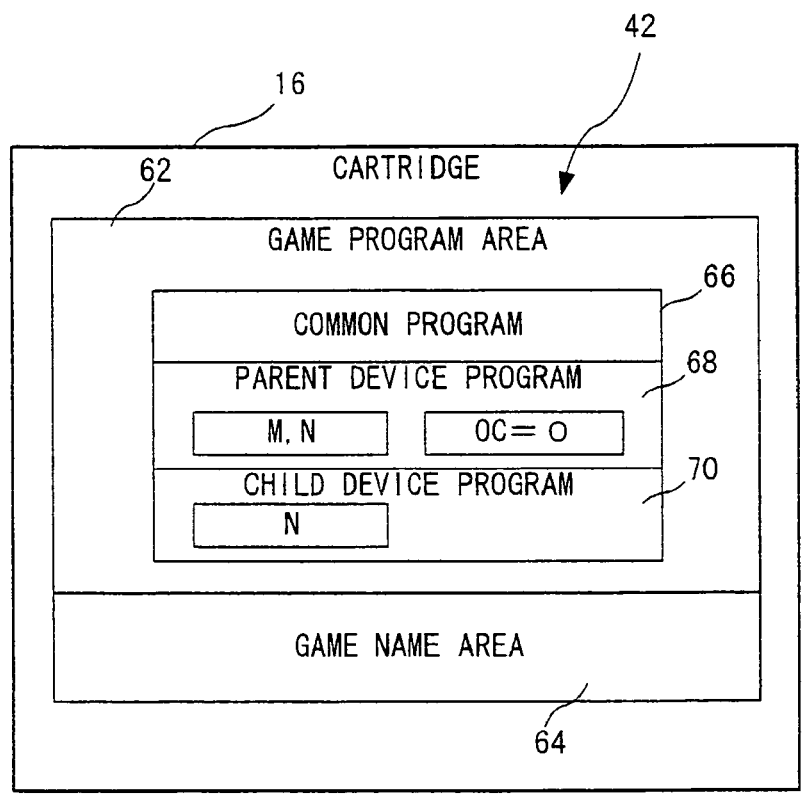
FIG. 15 is an illustrative view showing one example of a memory map of a cartridge not applicable to the OC mode.
Figure 16:
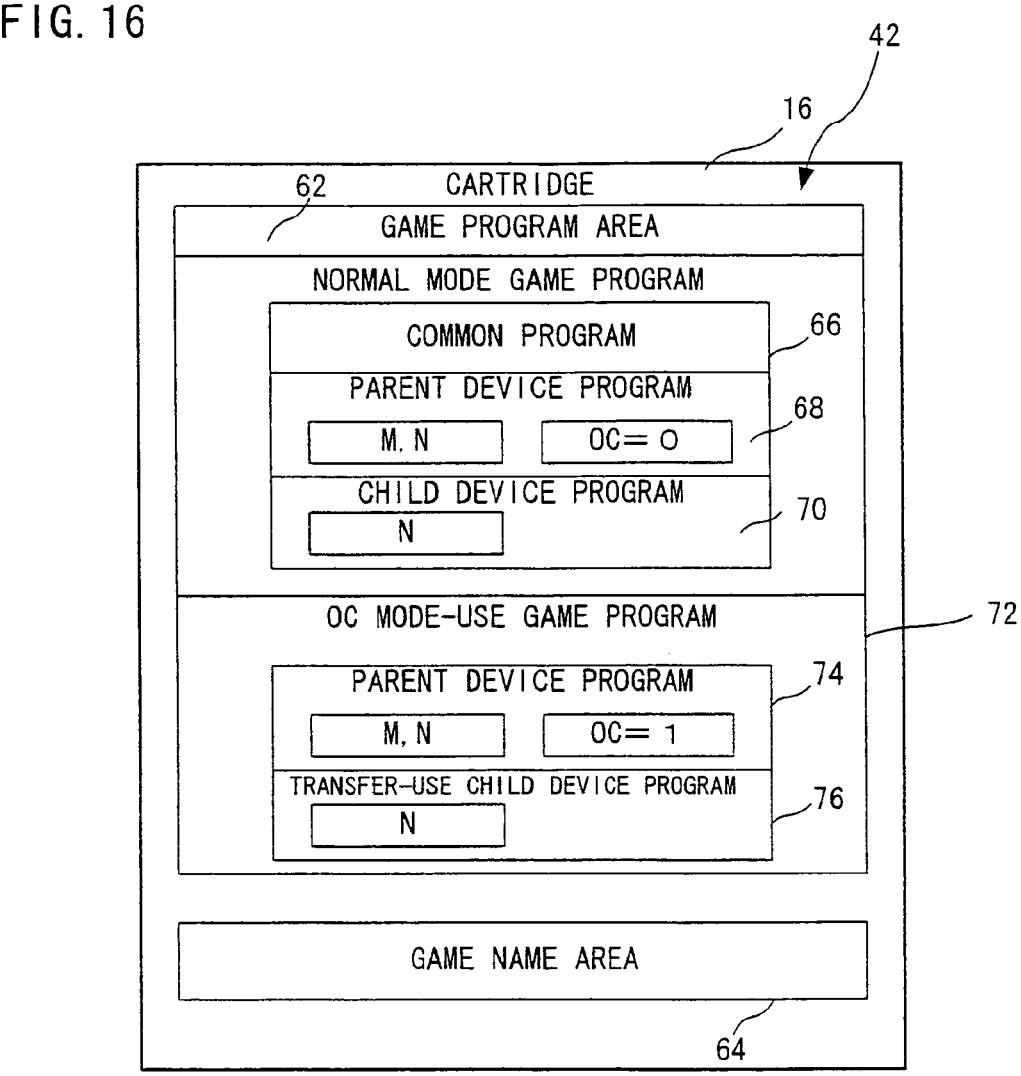
FIG. 16 is an illustrative view showing one example of the memory map of a cartridge applicable to the OC mode.

FIG. 15 shows a memory map of the cartridge not applicable to the OC mode, and FIG. 16 shows a memory map of the cartridge applicable to the OC mode.

In the FIG. 15 embodiment, the ROM 42 (FIG. 1) included in the cartridge 16 includes a game program area 62, and a game name area 64. In the game program area 62, a common program 66, a parent device program 68, and a child device program 70 are stored in advance. The common program 66 is a program used in spite of the user's own apparatus being the parent device or the child device. That is, in a case that the user's own apparatus is the parent device, the common program and a parent device program described later are executed, and in a case that the user's own apparatus is the child device, the common program and a child device program described later are executed. The parent device program 68 is a program operated only when the user's own apparatus functions as the parent device, and in addition to including variables M and N, includes the flag OC set to "0" (that is, turned-off). However, the variable M indicates the maximum number of the child devices possible to simultaneously connect to the parent device, and the variable N indicates the maximum number of slots that one child device can use. It is noted that both the variables M and N change dependent on to the game. The child device program 70 is a program operated only when the user's own apparatus is functioned as the child device, and includes the above-described variable N. In the game name area 64, a name of the above game programs such as Mario Kart-1 (Trademark), Golf, . . . , and etc. is stored in advance.

In an embodiment in FIG. 16, the ROM 42 of the cartridge 16 includes the game program area 62 and the game name area 64. In the game name program area 62, the same common program 66, the parent device program 68, and the child device program 70 as in FIG. 15 are set, and an OC mode-use game program 72 is set in order to be applicable to the OC mode. The OC mode-use game program 72 includes a parent device program 74, and a transmission-use child device program 76. The parent device program 74 is the same as the above parent device program 68 except that the flag OC is set to "1". The transmission-use child device program 76 is a program for transferring to the child device that plays the game in the OC mode, and includes the variable N. The child device that applies for entry in the OC mode is capable of participating in the game by receiving this transmission-use child device program 76 transmitted (downloaded) from the parent device.

Figure 17:
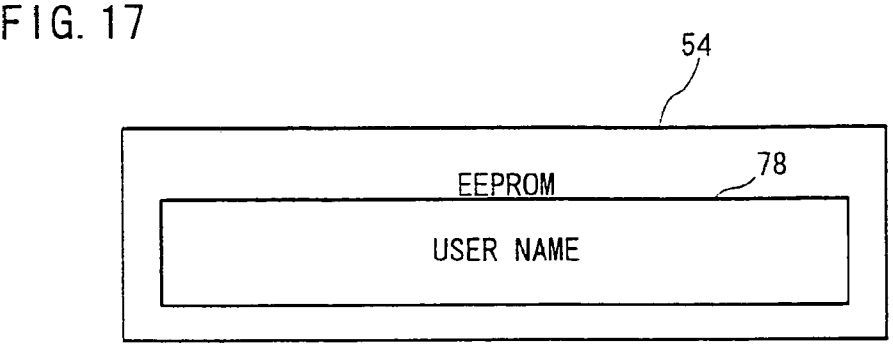
FIG. 17 is an illustrative view showing one example of the memory map of an EEPROM included in the wireless communication unit of the FIG. 1 embodiment.

The memory map of the EEPROM 54 of the wireless communication unit 14 shown in FIG. 1 is shown in FIG. 17, and as shown in FIG. 17, the EEPROM 54 includes a user name area 78. In the user name area 78, the user name such as "Taroh", "Ichiroh", . . . , or the like as in the above-described example, is registered.

Figure 18:
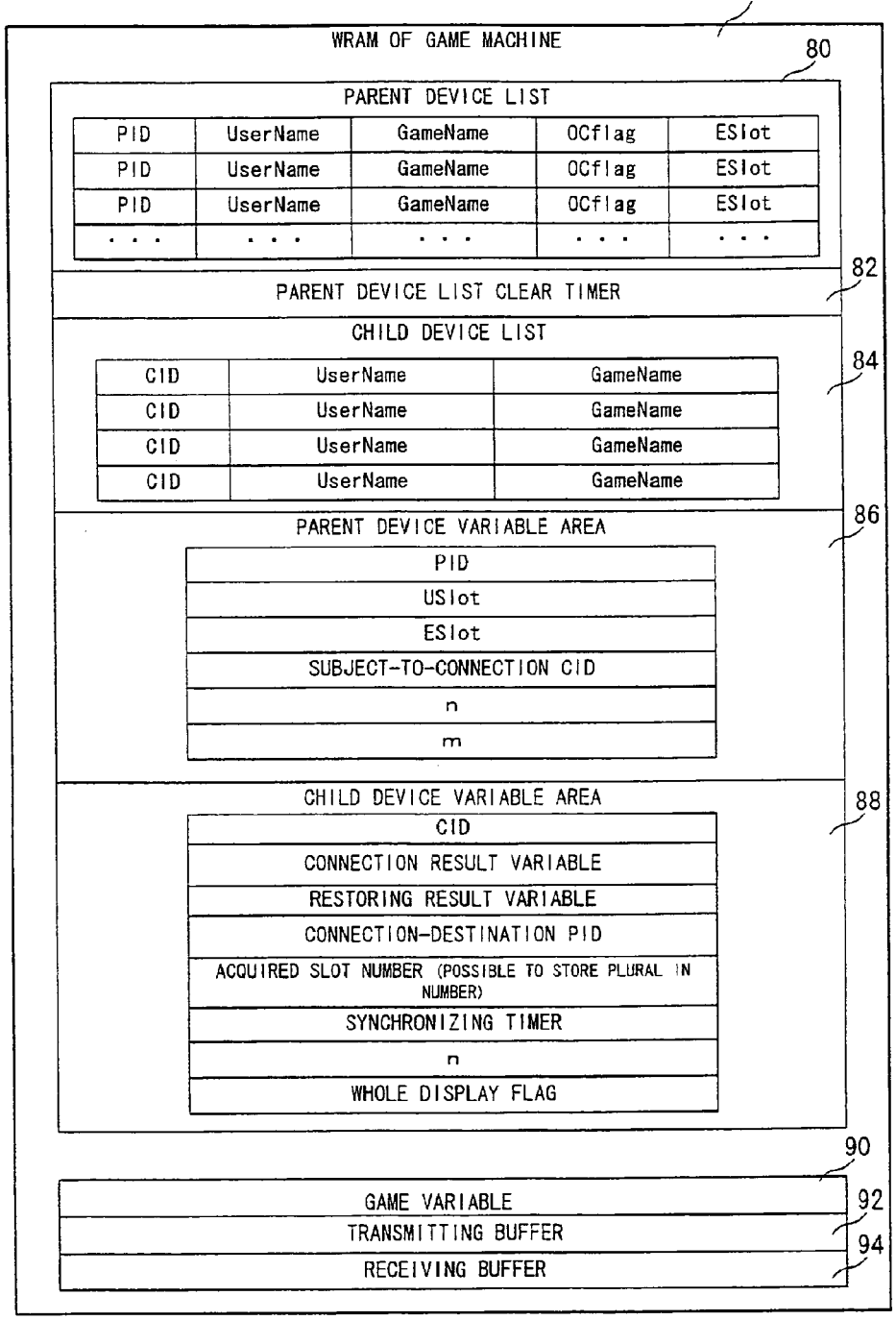
FIG. 18 is an illustrative view showing one example of the memory map of an internal RAM of a mobile game machine forming the mobile game apparatus in the FIG. 1 embodiment.

Referring to the memory map shown in FIG. 18, the WRAM 28 of the game machine 12 (FIG. 12) includes a parent device list area 80, a parent device list clear timer 82, a child device list area 84, variable areas 86 and 88, a game variable area 90, a transmission buffer area 92, and a reception buffer area 94.

The parent device list area 80 is an area for temporarily storing/holding the data for displaying the parent device list 18A described earlier in FIG. 3, and etc. such as the parent device number (PID), the user name (UserName), the game name (GameName), the flag OC, the E slot field ESlot, for example.

The parent device list clear timer 82 is a timer for measuring a time period until clearing the data of this parent device list area 80, and as described later, if a time set to this timer 82 is up, the parent device list area 80 is automatically cleared.

The child device list area 84 is an area for temporarily storing/holding the data for displaying the child device list 18B described earlier in FIG. 9 and etc., such as the child device number (CID), the user name (UserName), and the game name (GameName), for example.

The WRAM 28 further includes the parent device variable area 86 for storing a variable used when the user's own apparatus is operated (behaves) as the parent device, and the child device variable area 88 for storing a variable used when the user's own apparatus is operated (behaves) as the child device.

In the parent device variable area 86, data for the respective fields PID, USlot, and ESlot and the child device number (CID) of the child device subject to connection, and in addition, variables n and m are set. Herein, the variable n indicates the number of slots currently and actually assigned to one child device, and its maximum number is applied by the above-described variable N. In addition, the variable m indicates the number of the child devices currently, actually and simultaneously connected to one parent device, and its maximum number is applied by the above-described variable M.

In the child device variable area 88, data for the field CID shown in FIG. 12 is set, for example, and a variable showing a connection result, a variable showing a restoring result, the parent device number (PID) of a connection-destination parent device, the number of acquired slots (one or plural number), a synchronizing timer, the variable n, and furthermore, the all-display flag are set.

The game variable area 90 is an area for storing game variables of the game being executed such as variables showing the number of cleared stages, an acquired item, and etc, for example. In addition, a transmission buffer 92 and a reception buffer 94 are areas for temporarily storing transmitting data and receiving data, respectively.

More than one mobile game apparatuses 10 each of which has such the structure constructs the game system, and descriptions regarding an operation of each mobile game apparatus 10 in the game system are made below by referring to flow charts.

Prior to the detailed descriptions, in a case that the cartridge not applicable to the OC mode is attached to the user's own apparatus, and the user's own apparatus becomes the parent device, a series of steps S29 (FIG. 21)-S69 (FIG. 23) described later are executed. In addition, in a case that the cartridge not applicable to the OC mode is attached to the user's own apparatus, and the user's own apparatus becomes the child device, a series of steps S83-S109 (FIG. 24) described later are executed.

Furthermore, in a case that although the cartridge applicable to the OC mode is attached to the user's own apparatus, the game is played in the normal mode (not OC mode), when the user's own apparatus becomes the parent device, a series of the steps S29 (FIG. 21)-S69 (FIG. 23) described later are executed. When the user's own apparatus becomes the child device similar to the above, a series of the steps S83-S109 (FIG. 24) described later are executed.

Figure 23:
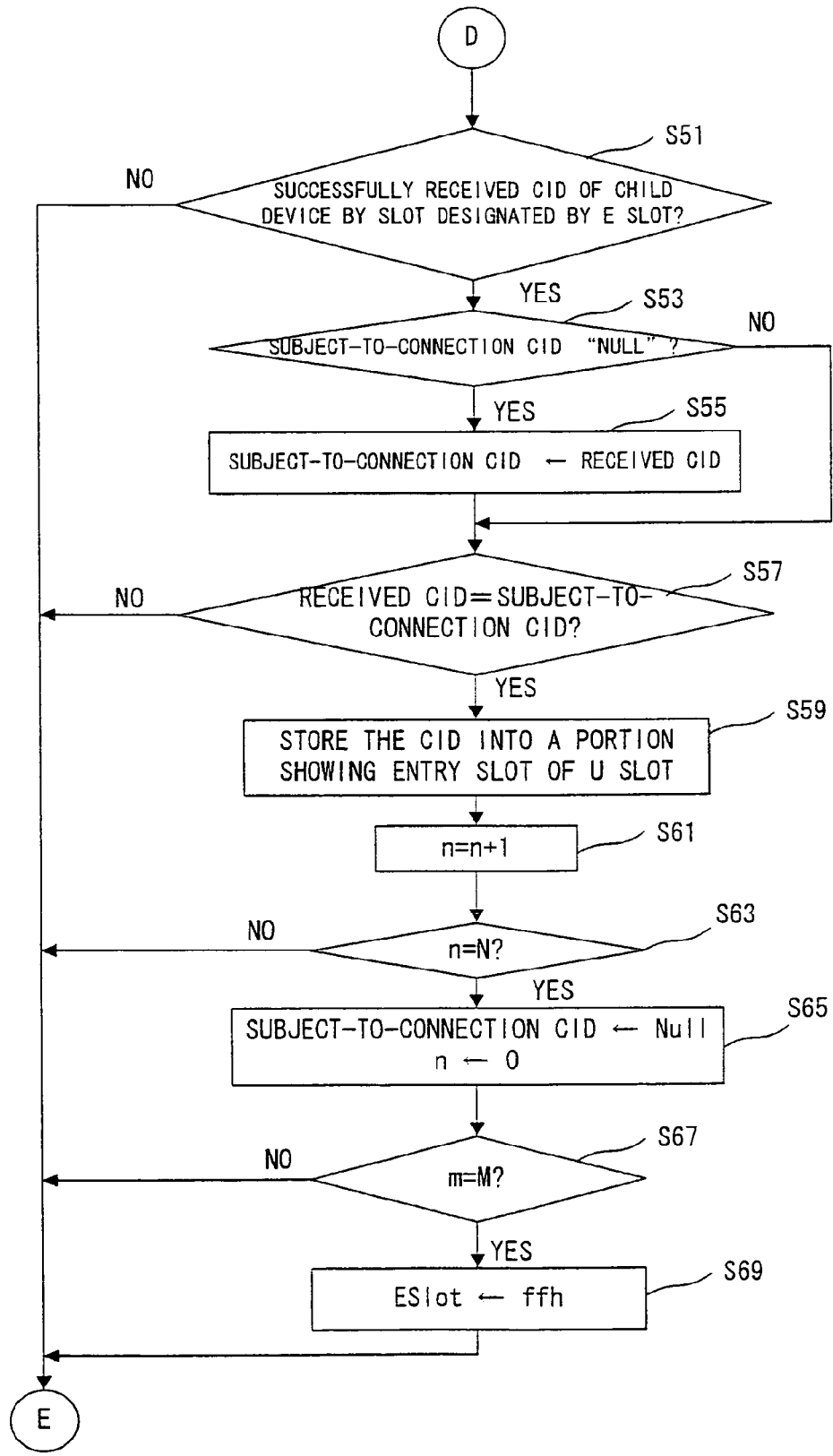
FIG. 23 is a flowchart showing a succeeding part of FIG. 22.

Moreover, in a case that the cartridge applicable to the OC mode is attached to the user's own apparatus, and the game is played in the OC mode, the user's own apparatus cannot function other than the parent device. In this case, via steps S75 and S77 (FIG. 19), similar to the above case of the parent device, a series of the steps S29 shown in FIG. 21—S69 shown in FIG. 23 are executed.

Figure 26:
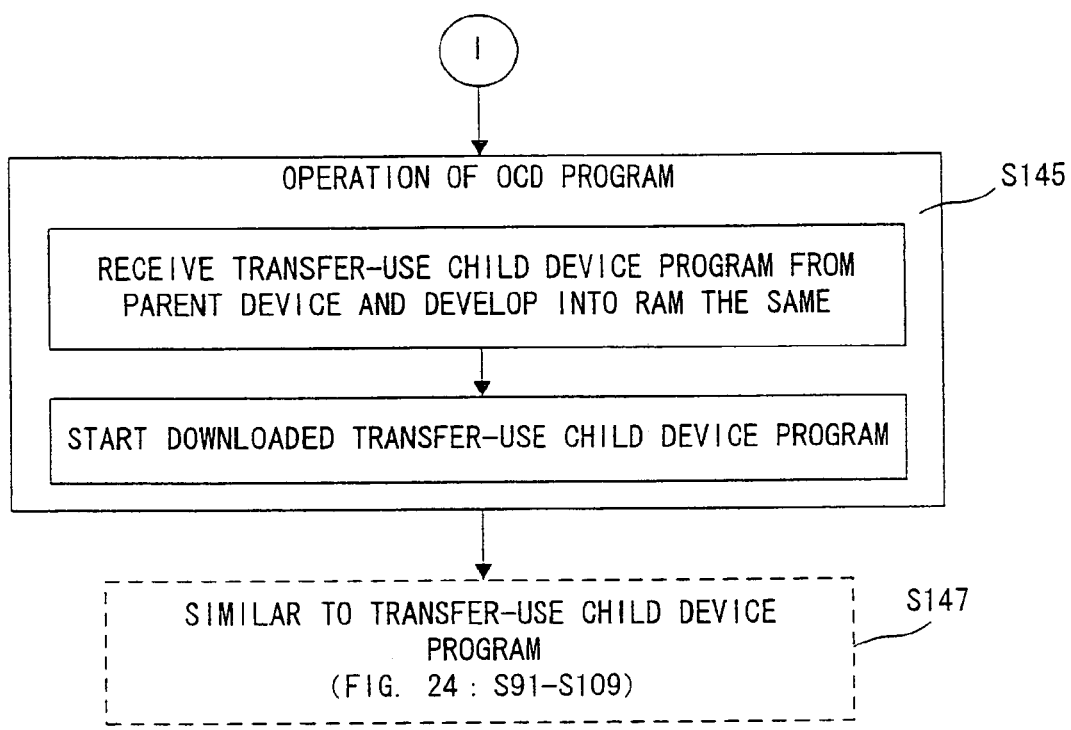
FIG. 26 is a flowchart showing a succeeding part of FIG. 25.

In addition, in a case that the cartridge is not attached to the user's own apparatus, the user's own apparatus can only become the child device in the OC mode, and therefore, in this case, a series of steps S111 (FIG. 19)-S147 (FIG. 26) are executed.

Figure 19:
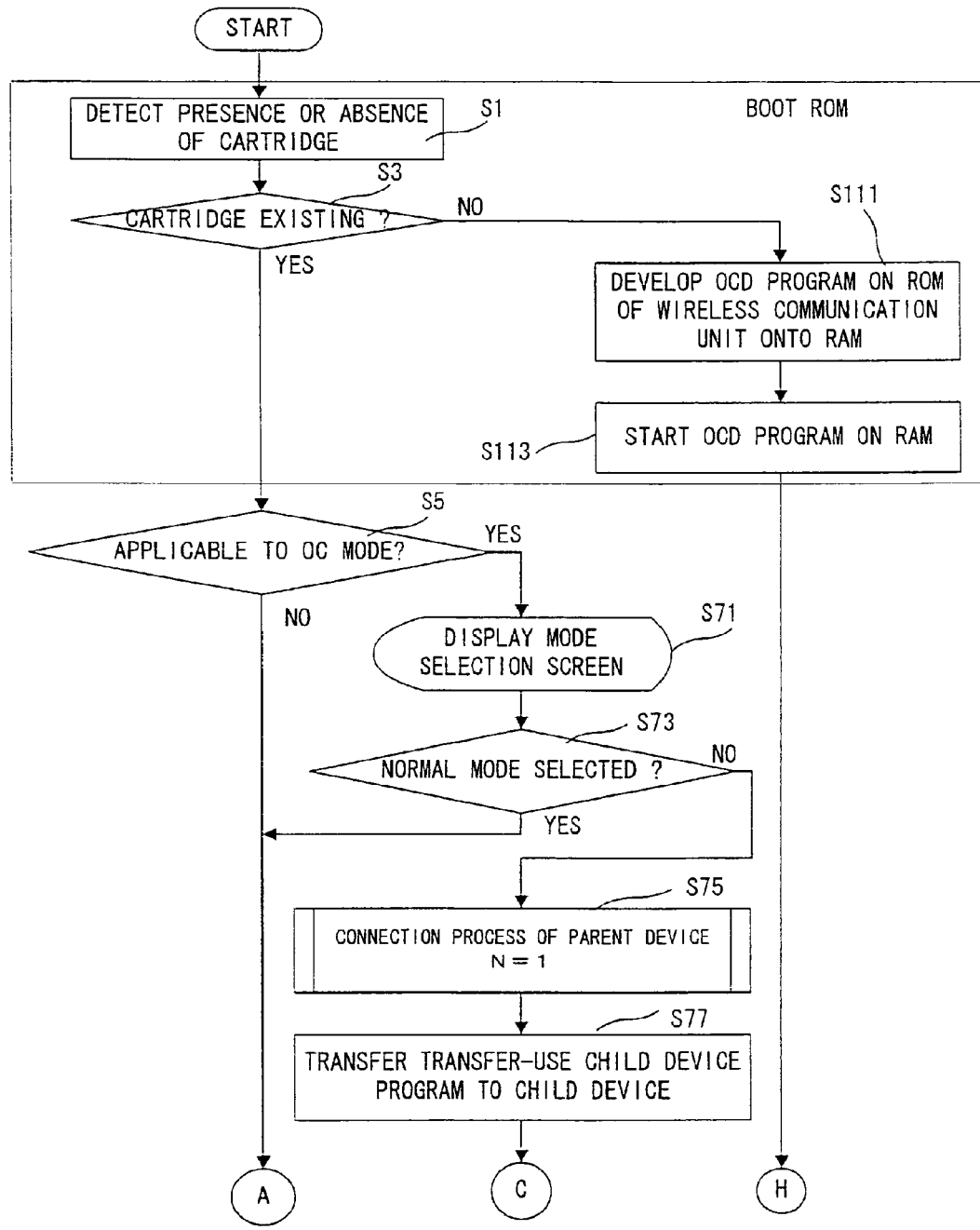
FIG. 19 is a flowchart showing a part of a main flow showing an operation of the mobile game machine in the FIG. 1 embodiment.

FIG. 19 shows an operation of the mobile game machine 12. When a power source (not shown) of the mobile game machine 12 is turned-on, an operation in FIG. 19 is started. First, an operation set within the Boot ROM 24 is executed. That is, in a first step S1, the processor 20, based on a signal from the connector 40 (FIG. 1), for example, detects whether or not the cartridge 16 is attached, and in a case that there is the cartridge in a step S3, the process moves to a program of the ROM 42 of the cartridge 16. In a succeeding step S5, it is determined whether or not the cartridge is a cartridge applicable to the OC mode. In this step S5, it is determined whether the cartridge in FIG. 15 (cartridge not applicable to the OC mode) is attached or the cartridge in FIG. 16 (cartridge applicable to the OC mode) is attached.

Figure 20:
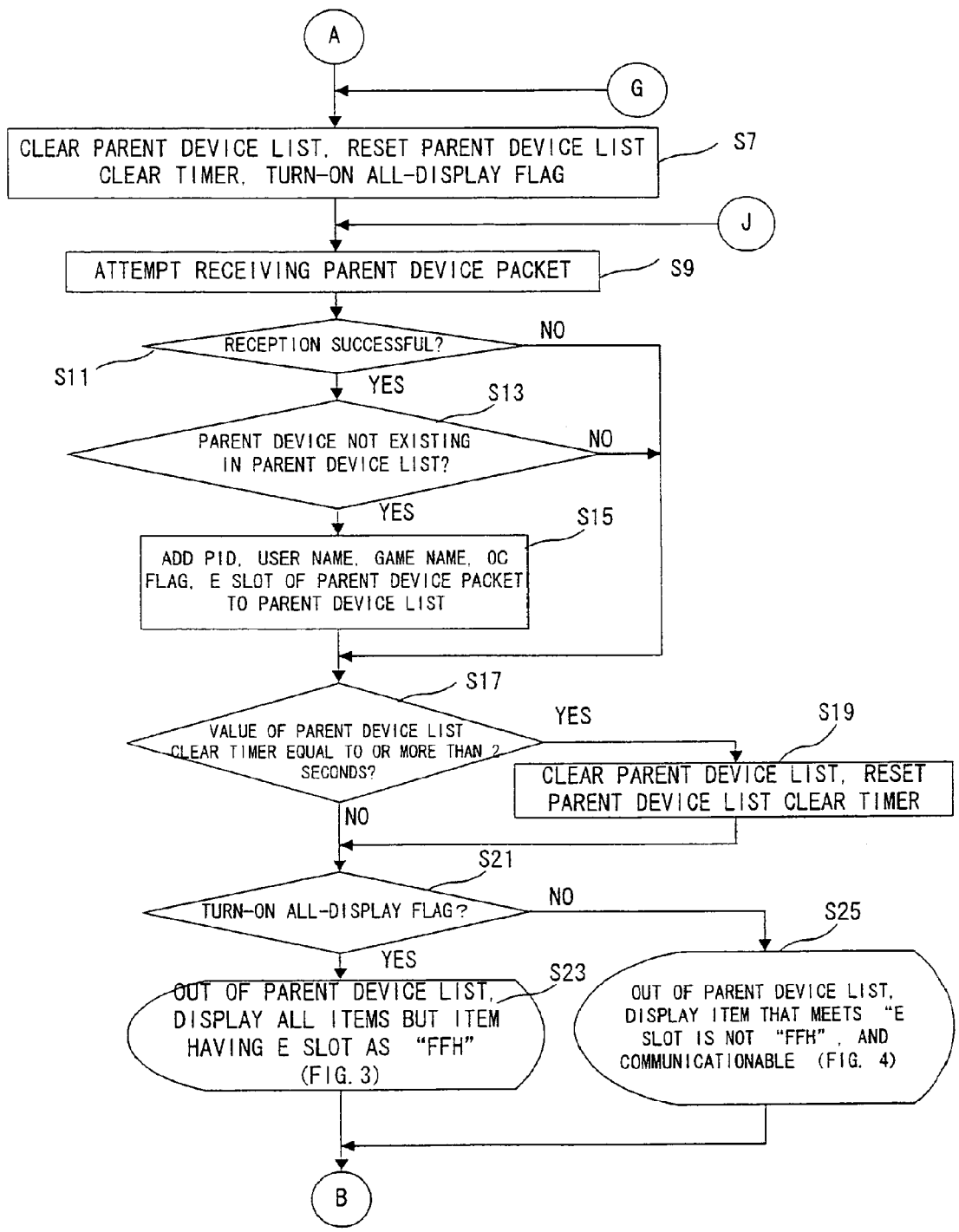
FIG. 20 is a flowchart showing a succeeding part of FIG. 19.

In a case that "NO" is determined in the step S5, that is, in a case that although the cartridge is attached to the user's own apparatus, the cartridge is a cartridge not applicable to the OC mode, the process advances to a step S7 in FIG. 20, in addition to clearing the parent device list area 80 shown in FIG. 18, resets the parent device list clear timer 82 similarly shown in FIG. 18. Furthermore, the all-display flag set to the child device variable area 88 in FIG. 18 is turned-on ("1" is set). It is noted that the parent device clear timer 82 automatically starts counting the timer after the resetting.

Subsequently, in a step S9, it is attempted to receive the parent device packet as shown in FIG. 11. In the step S11, it is determined whether or not the parent device packet is successfully received. Then, if "YES" is determined in the step S11, in a succeeding step S13, it is determined whether or not the parent device that broadcasts is the parent device not existing in the parent device list. More specifically, in this step S13, it is determined whether or not the parent device PID and the user name out of the data of the received parent device packet (data temporarily stored in the reception buffer 94 of the WRAM 28 shown in FIG. 18) is the parent device registered in the parent device list 80 (FIG. 18). If "YES" is determined in this step S13, that is, in a case of a new parent device, in a succeeding step S15, the processor 20 newly registers in the parent device list 80 the parent device ID (PID), the user name (UserName), the game name (GameName), the OC flag (OC), and the entry slot (ESlot) included in the parent device packet.

When "NO" is determined in the preceding step S11, or when after finishing registration in the step S15, in a succeeding step S17, it is determined whether or not a value of the parent device list clear timer 82 reset in the preceding step S7 becomes equal to or longer than two seconds. If "YES", the parent device list 80 is cleared in a step S19, and the parent device list clear timer 82 is reset. Herein, the reason why the parent device list clear timer 82 is reset is that as described above, by referring to FIG. 8, in a case that a certain parent device ("Jiroh" in FIG. 8) comes out of the communicable range, it is necessary to delete the parent device from the parent device list 80. Therefore, by regularly (every two seconds in this embodiment) clearing the parent device list 80 and making a registration to the list of the parent device existing within the communicable range from the start, the parent device that comes out of the communicable range is not remained in the parent device list. When "NO" is determined in the step S17, or after executing the step S19, in a succeeding step S21, the processor 20 determines whether or not the above-described whole display flag is turned-on ("1"). It is noted that in this embodiment, this whole display flag is set to "1" or turn-on as a default. When the all-display flag is turned-on, in a step S23, the parent device having the entry slot ESlot not "ffh" out of the parent devices registered in the parent device list, that is, information (more specifically, the user name UserName, and the game name GameName) on all the parent devices that accept a new entry of the child device is displayed as shown in FIG. 3. When the all-display flag is turned-off ("0"), in a step S25, information (the user name UserName and the game name GameName) of the parent device having the entry slot ESlot not "ffh", and that is communicable (that is, the game of the cartridge of the parent device and the game of the cartridge of the child device are in a predetermined relationship, and communicable with each other), out of the parent devices registered in the base list, is displayed as shown in FIG. 4.

Subsequently, the process advances to a step S27 in FIG. 21, and the processor 20 refers to a signal from the operation key 38 so as to determine whether or not the B button (not shown) is depressed. That the B button is depressed means that the user of the mobile game apparatus determines to make the user's own apparatus behave as the parent device, and in this case, in order to accept the child device within the variables M and N, a parent device connection process of a step S29 is executed. It is noted that the variable N indicating the maximum number of slots applied to one child device and the variable M indicating the maximum number of child devices possible to participate are changeable depending on the game, respectively. In order to increase the maximum number of child devices possible to participate M, the maximum number of slots N may be rendered small, and if a data rate is important, the maximum number of slots N may be rendered large, and the maximum number of child devices possible to participate M may be rendered small, for example.

Herein, referring to FIG. 27 and FIG. 28, detailed descriptions will be made regarding a connection process of the parent device in a step S29 for inviting the child device. In a step S1001, which is a first step in FIG. 27, the processor 20 clears the child device list area 84 shown in FIG. 18, and displays an initial display. This step S1001 is a initial setting step, and in addition to the above process, further sets the maximum number (N) of sub time slots assigned to one child device, and sets the maximum number (M) of the child devices accepting the entry. It is noted that each of the maximum numbers of N and M can be determined in accordance with the game program to be executed. Thus, if the maximum number N of the sub time slots assigned to one child device and the maximum number M of the child devices possible to simultaneously participate are to be determined according to the game, of a constant number of the sub time slot, it is possible to determine whether to increase the number of the child devices possible to participate by decreasing the number of the slots assigned to one child device or to increase the data rate by increasing the number of the slots assigned to one child device in correspondence to a content of the game. In a case that the more the player, the more interesting the game, the number of the slots N may be rendered small, and the number of the participating child devices M may be rendered large. In a case of the game requiring a large communication amount, the number of the slots N may be rendered large, and the number of the participating child devices may be rendered small.

In a succeeding step S1003, the processor 20 writes a pseudo random value into the area PID for setting the parent device PID of the parent device variable area 86 (FIG. 18). Next, in a succeeding step S1005, the variable m indicating the number of child devices actually connecting to the parent device (user's own apparatus) within the communicable range is rendered zero (0), and in a succeeding step S1007, "Null" is set to the area of a subject to connection CID indicating the number of child devices subject to connection. In addition, zero (0) is written into the variable n, within the area 86, indicating the number of slots actually allotted to the child device under a connection process. It is noted that the subject to connection CID is a CID of the child device under the connection process, and is for ignoring an entry request from the child device of the CID other than the subject to connection CID, in a case that a plurality of the slots are to be allotted to one child device in the entry process, when allotting of the slot to a certain child device is started in order to allot a plurality of the slots to the certain child device in a successive number. In a succeeding step S1009, one of the vacant slot numbers is assigned to the entry slot area ESlot within the area 86.

Subsequently, in a succeeding step S1011, the processor 20 examines the signal from the operation key 38 (FIG. 1) so as to determine whether or not the A button (not shown) is depressed. If "YES" in the step S1011, which means that the user of the user's own apparatus (parent device) at that time refuses its child device's entry (see FIG. 9), thus in a succeeding step S1013, the processor 20 deletes from the child device list area 84 in FIG. 18 the data, USlot and CID of the selected child device. Subsequently, in a step S1015, a new child device list 18B is displayed as shown in FIG. 9.

Then, if "NO" is determined in the step S1011, that is, the user of the parent device did not depress the A button, or after executing the step S1015, the processor 20 determines whether or not the start key (not shown) is operated based on the signal from the operation key 38 in a step S1017. If "YES", the process directly returns. However, if "NO", in a succeeding step S1021, a transmission/reception process of the parent device shown in detail in FIG. 29 is executed.

Figure 27:
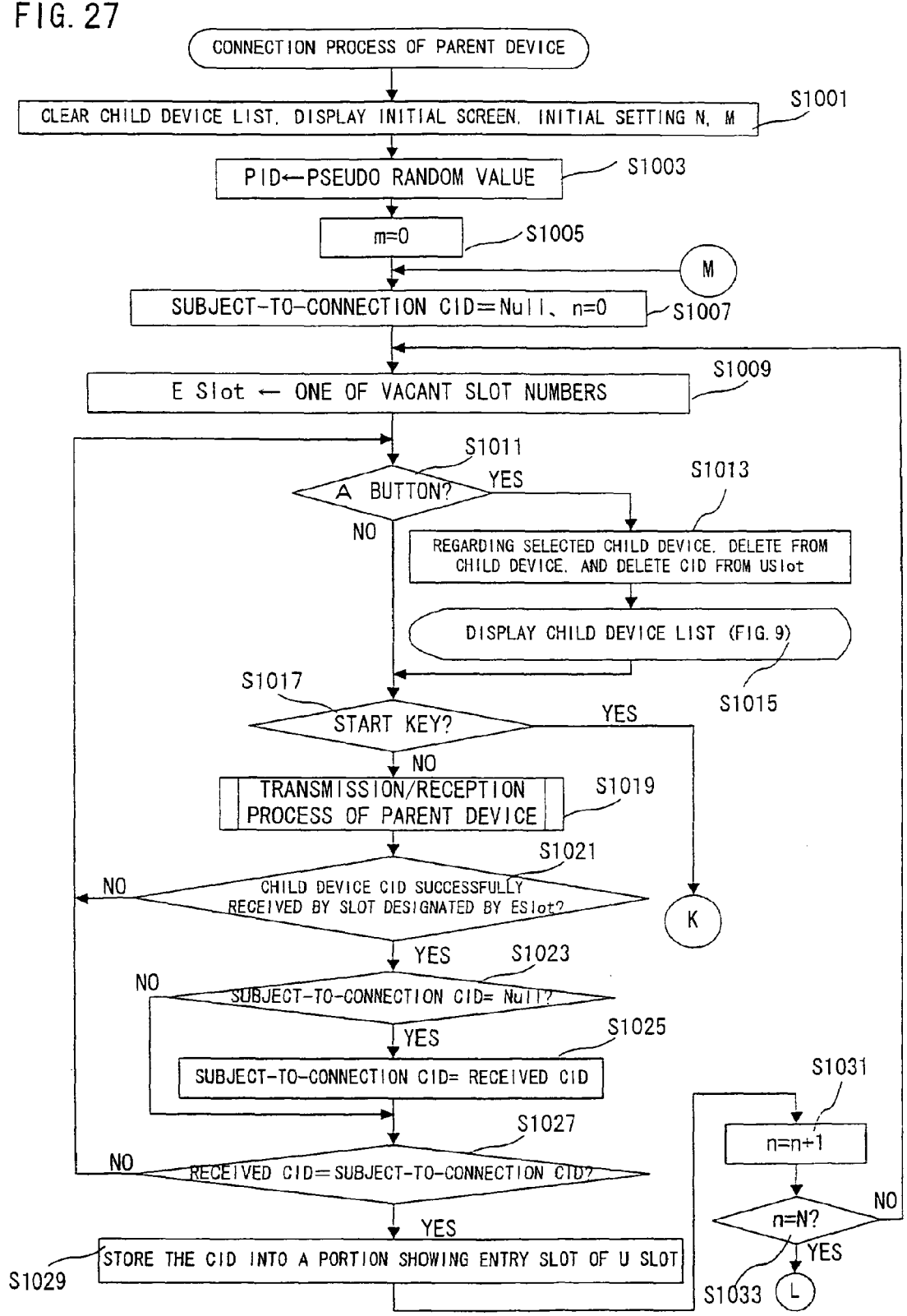
FIG. 27 is a flowchart showing a part of an operation of a connection process of a parent device.
Figure 29:
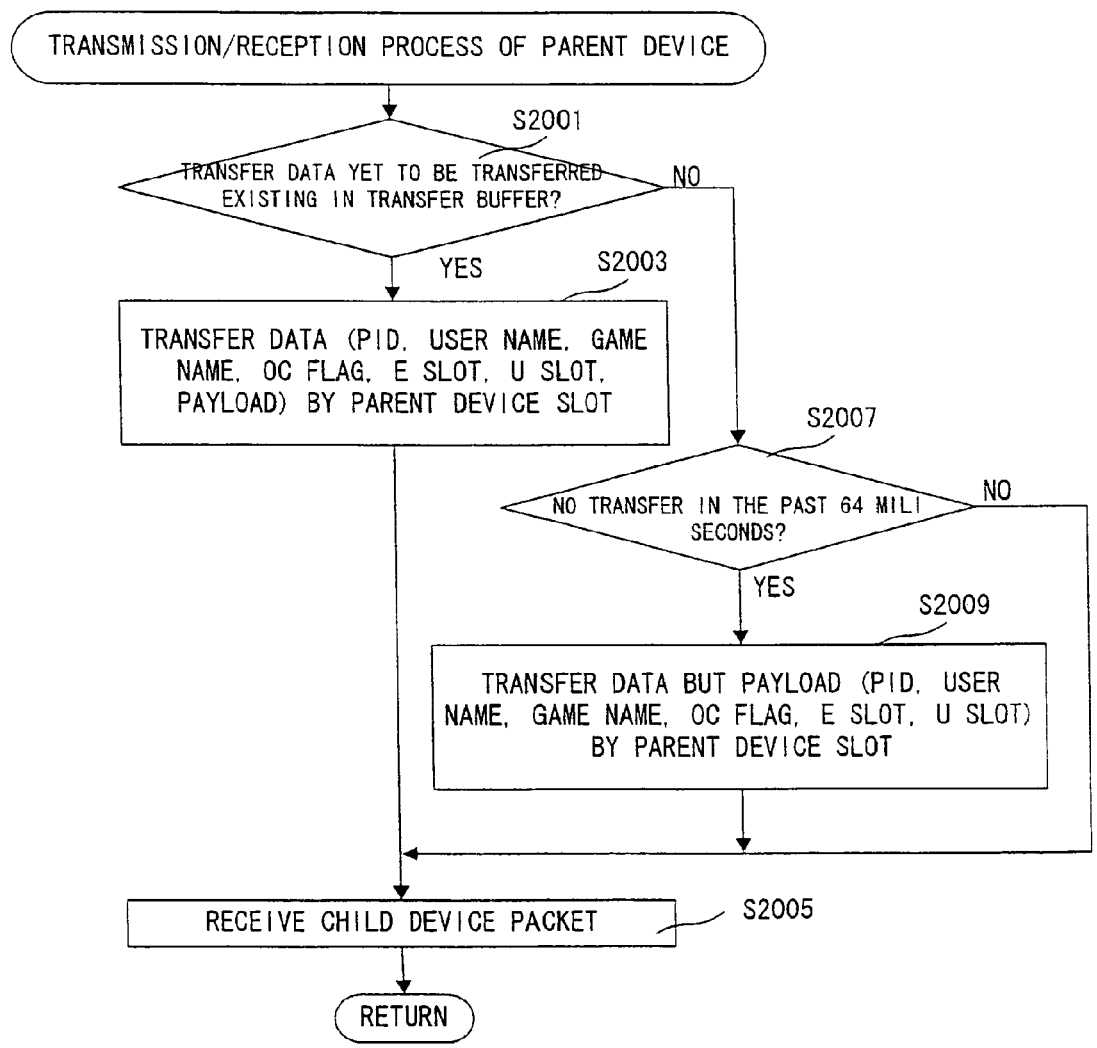
FIG. 29 is a flowchart showing an operation of a transmission/reception process of the parent device.

The transmission/reception process of the parent device shown in a step S1019 in FIG. 27 is shown in detail in FIG. 29. In a step S2001 in FIG. 29, the processor 20 determines whether or not there is data yet to be transmitted in the transmission buffer 92 (FIG. 18). If "YES", in a succeeding step S2003, data necessary for the parent device in FIG. 14 such as the PID, the user name, the game name, the OC flag, the E slot, the U slot, and the payload, which is the above-described data yet to be transmitted, for example, is transmitted. Then, in a succeeding step S2005, after receiving the child device packet, the process returns.

If "NO" is determined in the preceding step S2001, in a succeeding step S2007, the processor 20 determines whether or not no data transmission is made during the past 64 milliseconds. It is noted that a time period of this "64 milliseconds" is an example of a numerical value capable of dissolving a timer deviation, and needless to say, other numerical values may be possible.

If "YES" is determined in the step S2007, using the parent device slot, each data excluding the payload such as the PID, the user name, the game name, the OC flag, the E slot, and the U slot, for example, is transmitted in a step S2009. This step S2009 is a step necessary for enabling the entry from the child device, and even without the payload (data to be transmitted), the data necessary for the entry process (the PID, the user name, the game name, the OC flag, the E slot, and the U slot) is regularly transmitted, thus the child device is always capable of making the entry process. In this step S2009, the payload data is not transmitted. Next, after the step S2009 is ended, or when "NO" is determined in the step S2007, the process returns via the preceding step S2005.

Returning to FIG. 27, in the step S1021 subsequent to the step S1019, the processor 20 determines whether or not the child device CID is successfully received in the slot designated by the field ESlot of the parent device packet shown in FIG. 11 (that is, it is determined whether or not the child device uses the entry slot and makes the entry request). In a case of "NO" in this step S1021, the process returns to the preceding step S1011, and in a case of "YES", in a succeeding step S1023, it is determined whether or not the subject to connection child device CID of the child device variable area 86 in FIG. 18 is Null (that is, it is determined whether or not there is another child device currently under entry process). If YES, that is, if the number of the child device subject to connection (CID) is not registered, in a step S1025, the child device CID received in the step S1019 is registered as the number of the child device subject to connection (CID) in the subject to connection child device CID within the area 86 in FIG. 18.

When "NO" in the preceding step S1023, or after ending the step S1025, the processor 20 determines whether or not the received CID is the same as the subject to connection CID (that is, it is determined whether or not the received CID is the CID of the child device currently under connection process) in a step S1027. If "NO", the process returns to the preceding step S1011. If "YES", that CID is stored in a portion showing the entry slot of the U slot area USlot within the area 86 in FIG. 18 in a succeeding step S1029. Next, in a step S1031, the actual number of connecting slots n is incremented (+1), and in a step S1033, it is determined whether or not n=N, W, that is, the actual number of connecting slots n reaches the maximum number of slots N (varies depending on each game) applied to one child device. If "YES", since it is not accepted to allot more slots to the child device, the process advances to a succeeding step S1035 shown in FIG. 28. However, if "NO", since it is possible to allot more slots to the child device, the process returns to the step S1009.

Figure 28:
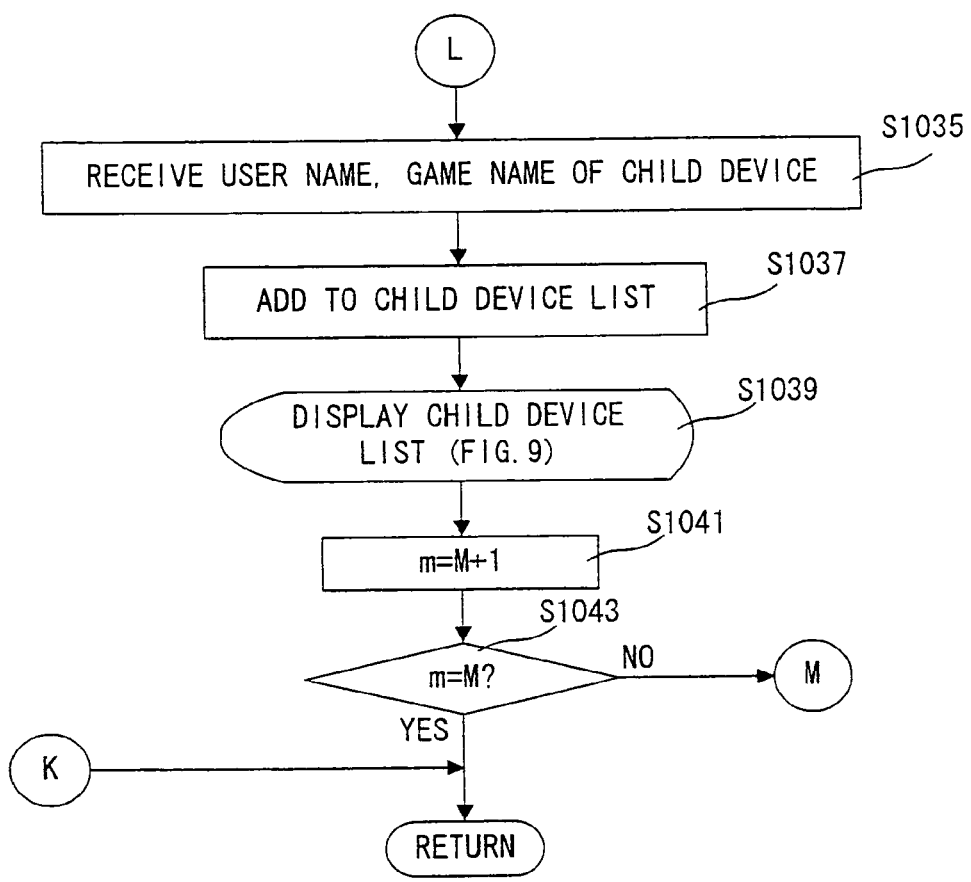
FIG. 28 is a flowchart showing a succeeding part of FIG. 27.

When the actual number of allotted slots n reaches the maximum number of allottable slots N, the entry process toward the child device is ended, and the process advances to a step S1035 in FIG. 28. However, in this step S1035, the processor 20 of the mobile game machine, which becomes the parent device, receives the user name, the game name, and etc. of the child device having the entry process ended. The user name and the game name of the child device are added to the child device list in a step S1037, and the child device list 18B is displayed as shown in FIG. 9 in a step S1039.

Subsequently, the processor 20 of the parent device, in a step S1041, increments (+1) the actual number of child devices m, and in a step S1043, determines whether or not the actual number of child devices m becomes equal to the maximum number of child devices to be connected M (varies depending on each game). If "YES" is determined in the step S1043, that is, it is determined that it is not possible to connect more child devices, the process directly returns.

On the contrary, in a case that it is still possible to connect more than one child devices, that is, "NO" is determined in the step S1043, the process returns to the step S1007 in FIG. 27.

Figure 21:
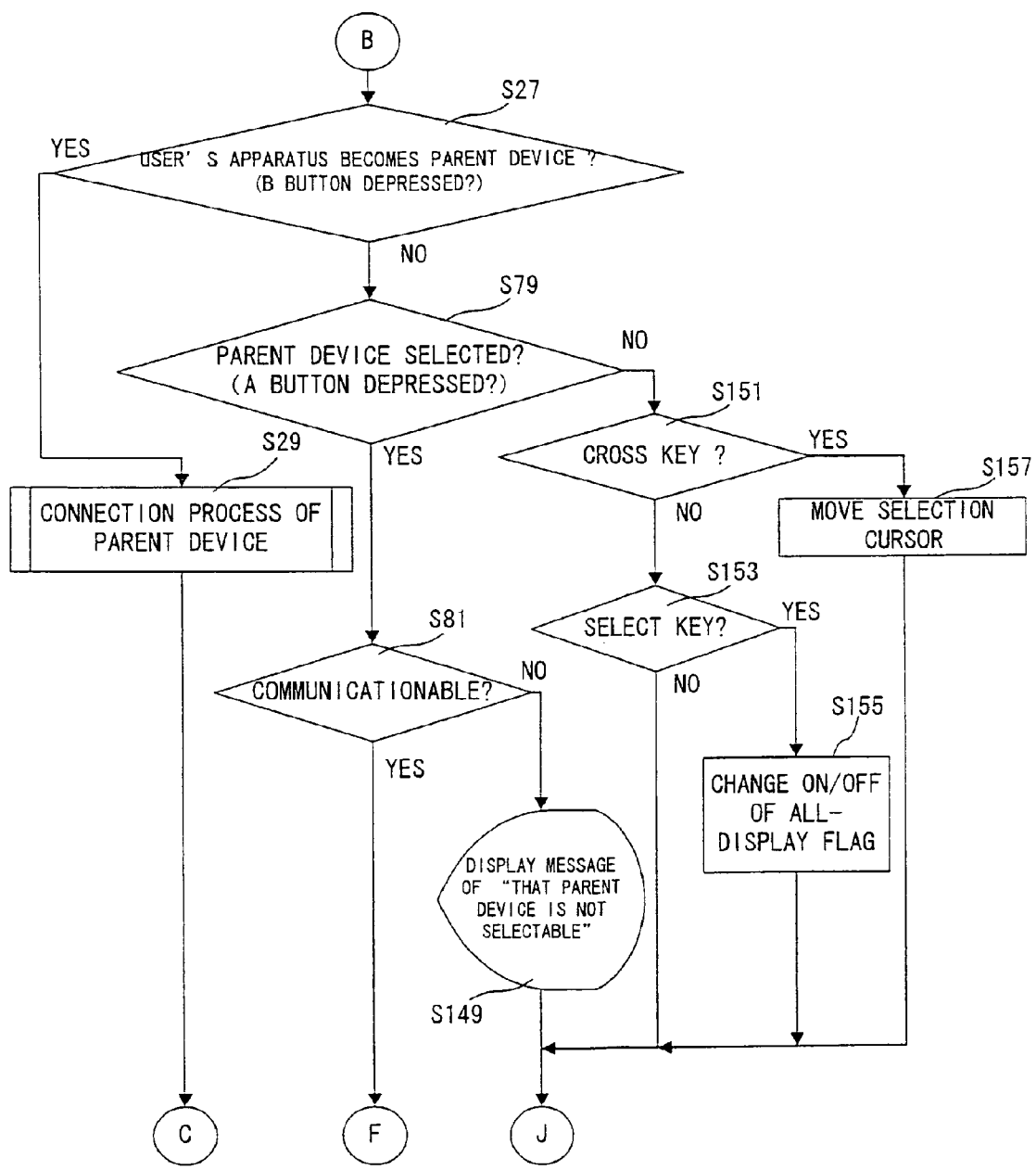
FIG. 21 is a flowchart showing a succeeding part of FIG. 20.
Figure 22:
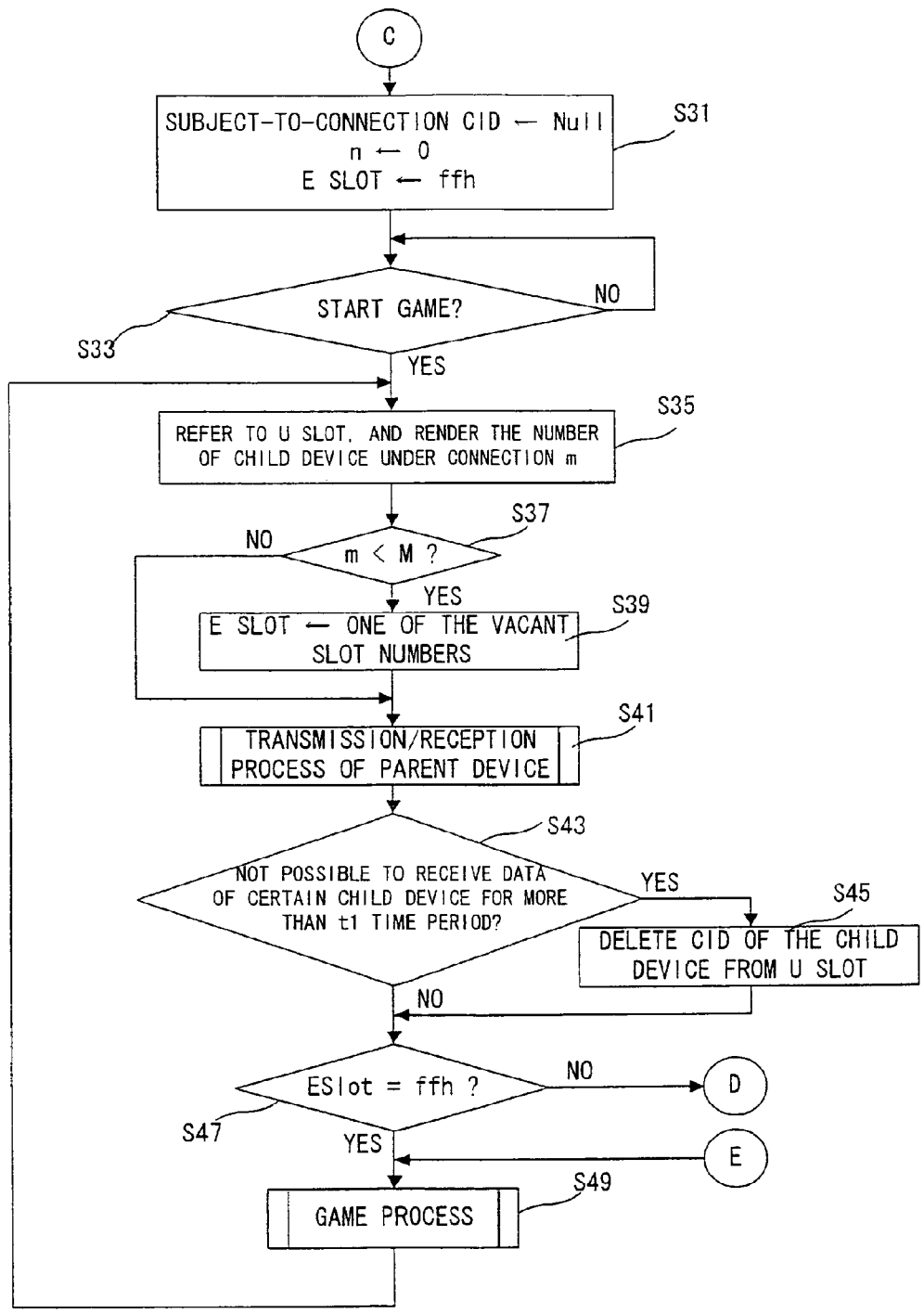
FIG. 22 is a flowchart showing a succeeding part of FIG. 21.

Thus, the connection process is executed in the step S29 in FIG. 21, and furthermore, in the step S31 in FIG. 22, it is temporarily stopped accepting the child device, and "ffh" is written into the entry slot ESlot in order to prohibit other child devices from participating. Next, as required during the game, in order to invite the child devices additionally, the subject to connection CID within the area 86 in FIG. 18 is rendered Null, that is, the actual number of connecting slots n=0.

Subsequently, it is determined whether or not the game is started in the step S33, that is, the start button (not shown) included in the operation key 38 is depressed. When the start button is depressed, in the succeeding step S35, the processor 20 refers to the U slot area USlot of the parent device variable area 86 shown in FIG. 8 so as to detect the number "m" of the child devices currently being connected. The number of areas, which is not "0h" out of each area of the U slot, is the number m currently being connected. Next, in the step S37, it is determined whether or not the number of the child devices being connected m is smaller than the maximum number of connections M. Being determined "YES" in this step S37 means that the new entry of the child device is accepted. Therefore, in this case, in the succeeding step S39, one of the vacant slot numbers (the slot number corresponding to the area, which is "0h", out of the U slots) is set to the E slot area ESlot of the parent device variable area 86. This cancels a state setting of the area ESlot of "fh".

Next, in the step S41, by the transmission/reception process of the parent device described by referring to FIG. 29 in advance, the parent device packet shown in FIG. 11 is broadcast (transmitted), and the child device data (packet) shown in FIG. 13 is received from the each child device.

Subsequently, in the step S43, the processor 20 determines whether or not the data of a certain child device is not successfully received for more than a predetermined time period t1. Being determined "YES" in this step S43 means that it is probable that the child device has already departed from the communicable range 64 (FIG. 2), and in this case, in the step S45, the processor 20 deletes the child device number CID of the child device from the U slot area USlot of the parent device variable area 86 (FIG. 18). As a result of this process, the child device slot used by the departed child device becomes a vacant slot, thus making it possible to allow a new entry of the child device instead of the departed child device.

When "NO" is determined in the step S43, or after the step S45 is ended, in the succeeding step S47, the processor 20 determines whether or not "ffh" is set to the E slot area ESlot of the parent device variable area 86. If "YES", in the succeeding step S49, the processor 20 executes the game process according to the game program 62 (FIG. 15) of the cartridge 16.

When "NO" is determined in the step S47 in FIG. 22, in order to accept a mid-course participation of the child device, the process advances to the step S51 in FIG. 23. In this step S51, the processor 20 of the parent device determines whether or not the child device CID is successfully received by the slot designated in the E slot field ESlot. If "YES", in the succeeding step S53, it is determined whether or not "Null" is written into the area of the subject to connection CID within the area 86 in FIG. 18. If "YES", that is, the CID of the child device subject to connection is not registered, in the step S55, the CID received by the slot designated in the E slot is registered in the area of the subject to connection CID.

When "NO" in the preceding step S53, or when the step S55 is ended, the processor 20 determines whether or not the received child device number CID is the same as the subject to connection CID in the step S57. If "YES", in the succeeding step S59, the child device CID is stored in a portion showing the entry slot of the U slot area USlot of the area 86 in FIG. 18. Next, in the step S61, the actual number of connecting slots n is incremented (+1), and in the step S63, it is determined whether or not n=N, that is, the actual number of connecting slots n reaches the maximum number of slots N allottable to one child device. If "YES", since it is no more possible to accept allotting the slot to the child device, the allotting of slot to the child device is ended, and in the step S65, "Null" is set to the area of the subject to connection CID within the area 86, and zero (0) is written into the variable n.

Subsequently, the processor 20 of the parent device, in the step S67, determines whether or not the actual number of connecting child devices m becomes equal to the maximum number of connectable child devices M. If "YES" is determined in this step S67, that is, it is determined that it is not possible to connect more child device, in the step S69, "ffh" is written into the E slot area ESlot.

It is noted that after the step S69, or when "NO" is determined in the steps S51, S57, S63 or S67, respectively, the process stops the mid-course participation process of the child device in each case, and returns (returns to the step S49 in FIG. 49) to the game process.

The above-described is a case that the cartridge not applicable to the OC mode is attached to the user's own apparatus, and a process of the mobile game apparatus of a case that the user's own apparatus becomes the parent device.

Next, descriptions will be made regarding a process of the mobile game apparatus of a case that the cartridge applicable to the OC mode is attached to the user's own apparatus.

When "YES" is determined in the step S5 in FIG. 19, that is, in a case that the cartridge applicable to the OC mode shown in FIG. 16 is attached to the user's own apparatus, in the succeeding step S71, the processor 20 displays a mode selection screen (not shown). Next, in a step S73, it is determined whether or not the normal mode is selected. If "YES", similar to when "NO" is determined in the preceding step S5, the process advances to the step S7 in FIG. 20. That is, a process of a case that the cartridge not applicable to the OC mode is attached is the same as the process of a case that the cartridge applicable to the OC mode is attached, and however, the normal mode is selected.

In a case that the cartridge applicable to the OC mode is attached to the user's own apparatus, and the game of the OC mode is played, the user's own apparatus can only become the parent device. Described in detail, If "NO" in a step S73, that is, in a case that the OC mode is selected, in the succeeding step S75, similar to the preceding step S29 (FIG. 21), the connection process of the parent device described in detail by referring to FIG. 27 and FIG. 28 is executed. It is noted that, at this time, the number of slots to be used N of one child device is "1" (N=1), and as the maximum number to be connected M, the number allowed inherently by the game is set. Subsequently, in the step S77, the processor 20 transfers (downloads) a transfer-use child device program shown in FIG. 16 to the child device. Subsequently, the process advances to the step S31 in FIG. 22, and executes each step that follows as described above.

The above-described is the process of the mobile game apparatus in a case that the cartridge applicable to the OC mode is attached to the user's own apparatus.

Next, descriptions will be made regarding a case that the cartridge not applicable to the OC mode is attached, and a process of the mobile game apparatus in a case that the user's own apparatus becomes the child device.

When "NO" is determined in the step S27 in FIG. 21, that is, when a selection that the user's own apparatus becomes the parent device is not made, in the succeeding step S79, the processor 20 of the mobile game machine 12 examines an operation signal from the operation key 38 so as to determine whether or not the A button (not shown) is depressed, that is, it is determined whether or not the parent device intending to connect is selected. If "YES" is determined in this step S79, the processor 20, next, in the step S81, determines whether or not possible to communicate between the selected parent device. That is, it is determined whether or not the cartridge of the parent device and the cartridge of the user's own apparatus are in a predetermined relationship and capable of making a communication with each other. When communicable, later, the process advances to a step S83 in FIG. 24 so as to execute the connection process of the child device. The connection process of the child device is described in detail in FIG. 30 and FIG. 31.

Figure 30:
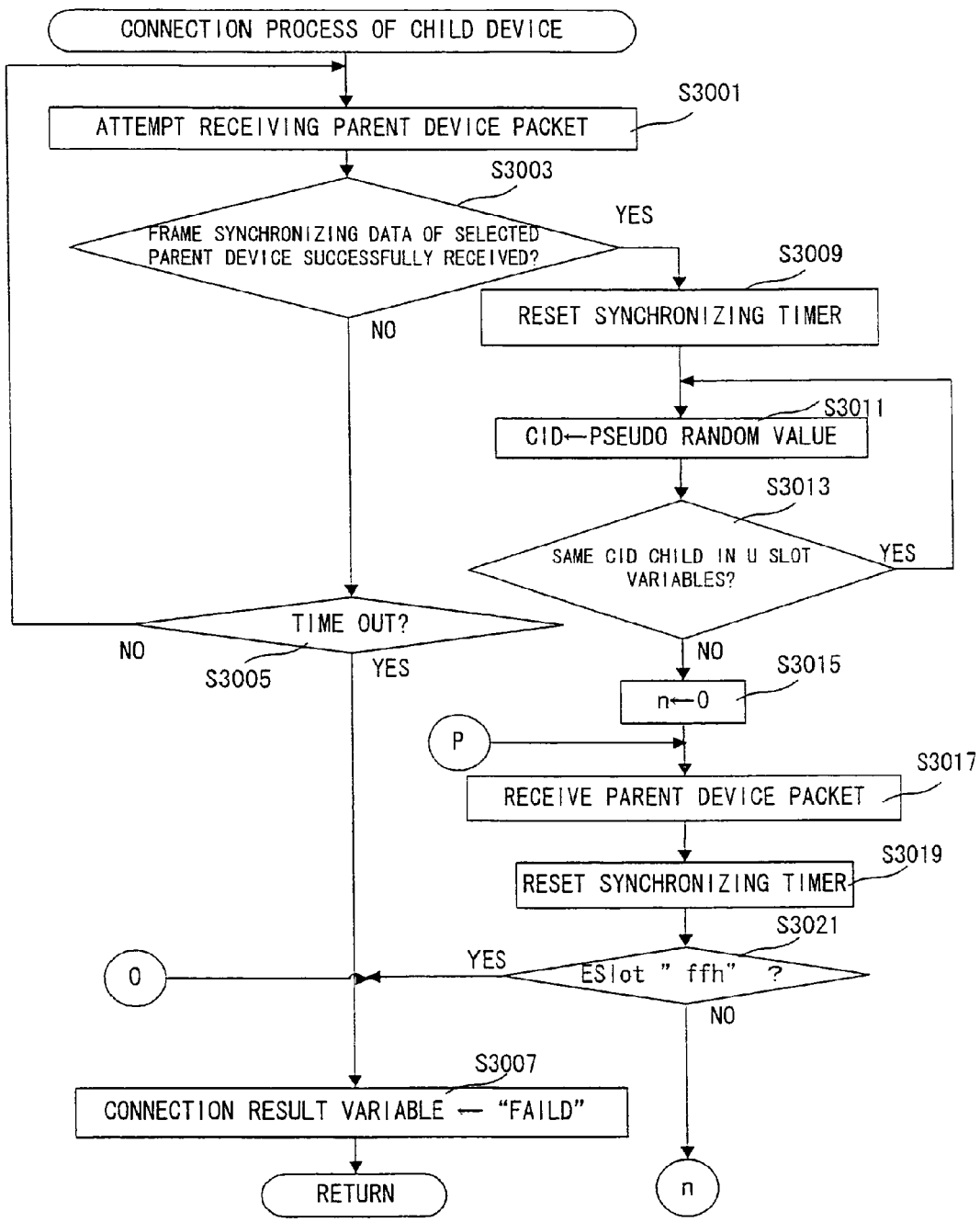
FIG. 30 is a flowchart showing a part of an operation of a connection process of a child device.

In a step S301, which is a first step in FIG. 30, the processor 20 of the mobile game machine that becomes the child device attempts to receive the parent device packet (FIG. 11). Next, in a succeeding step S3003, it is determined whether or not frame synchronizing data sync of the parent device selected in the menu screen is successfully received (FIG. 3, and etc.). More specifically, it is determined whether or not the synchronizing data sync of the parent device packet including the PID of the parent device selected on the menu screen is successfully received.

When "NO" is determined in the step S3003, that is, in a case that the parent device packet of the selected parent device is not successfully received, in a step S3005, it is determined whether or not it is time-out (time is run out), and if "NO" in this step S3005, the process returns to the preceding step S3001. However, if "YES", the process writes "failure" into a connection result variable (within the area 88 in FIG. 18) in a step S3007, and then, returns.

When "YES" is determined in the step S3003, that is, when the synchronizing signal of the subject parent device is successfully received, in a step S3009, the processor 20 of the child device resets a synchronizing timer (area 88), and advances to a succeeding step S3011. In this step S3011, the processor 20 renders the pseudo random value the ID number of the child device CID. Next, in a step S3011, it is determined whether or not the child device having the CID at this time is already present. That is, referring to the U slot of the received parent device packet, it is determined whether or not the same CID is already present. In a case that "YES" in the step S3013, it is necessary to change the number once allotted, and therefore, in this case, the step S3011 is once again executed, and by allotting a new number CID, the examination in the step S3013 is once again executed.

The steps S3011 and S3013 are repeated until "NO" is obtained in the step S3013, and when "NO" is obtained, the process advances to a succeeding step S3015. In the step S3015, the number of actually allotted slots n is rendered zero (0), and furthermore, in a succeeding step S3017, the parent device packet is received, and in a step S3019, the synchronizing timer is once again reset. Next, in a step S3021, the processor 20 determines whether or not the E slot ESlot of the received parent device packet (see FIG. 11) is "ffh". If "YES" is determined in this step S3021, since the entry of the parent device is prohibited, the process returns, assuming that this is "failure", via the preceding step S3007.

Figure 31:
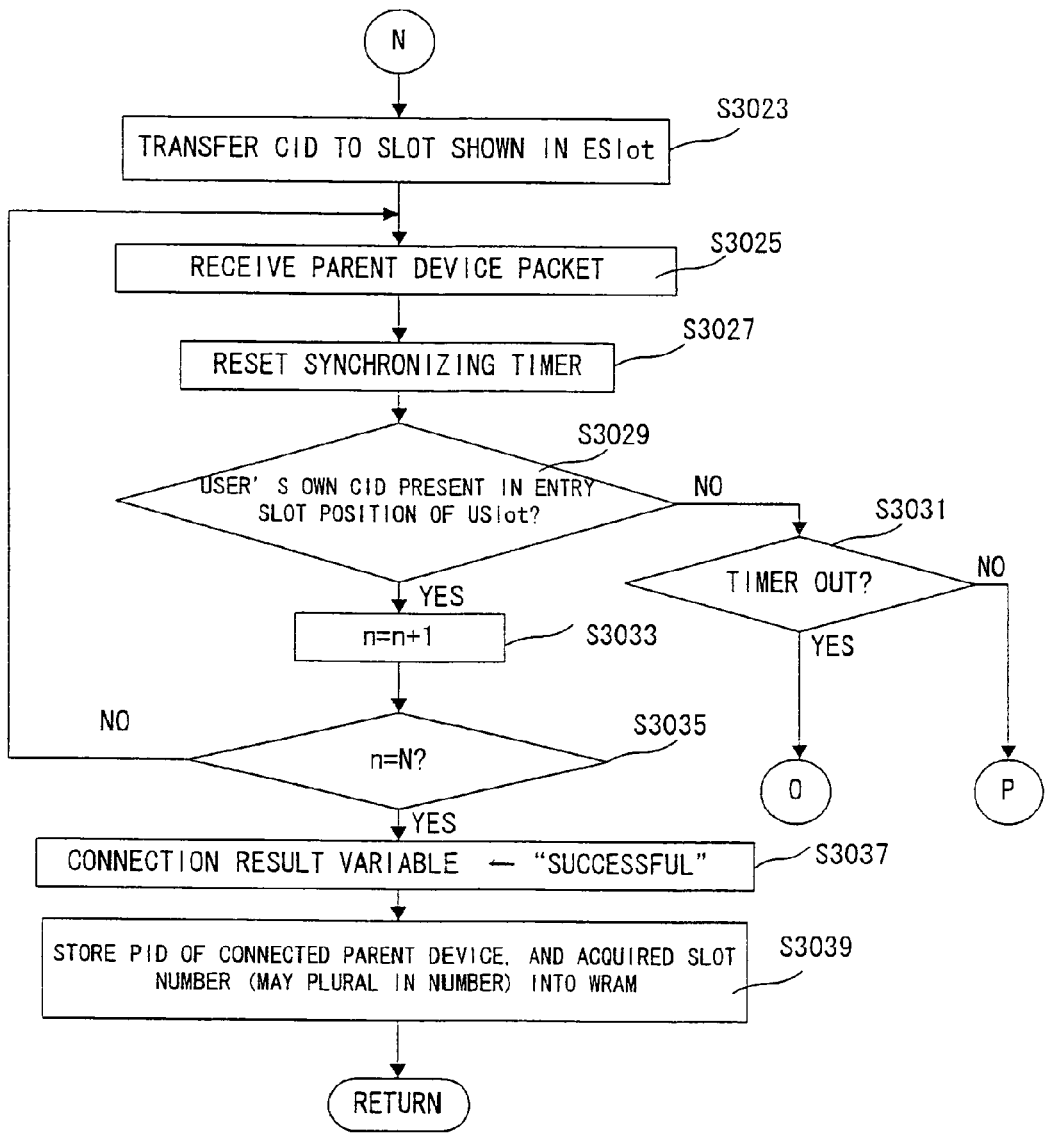
FIG. 31 is a flowchart showing a succeeding part of FIG. 30.

When "NO" is determined in the step S3021, the process advances to a step S3023 in FIG. 31 because the entry of the child device is not prohibited. In the step S3023, the CPU core of the child device transmits the number CID obtained in the step S3011 to the slot shown in the E slot field ESlot of the parent device packet at that time. Next, in a succeeding step S3025, the parent device packet is received, and in a step S3027, the synchronizing timer is once again reset.

Next, in a succeeding step S3029, the processor 20 of the child device confirms whether or not its own number (CID) is present in an entry slot position of the U slot field of the received parent device packet. Next, if "NO" is determined in this step S3029, in a succeeding step S3031, the processor 20 determines whether or not it is the time-out. In a case that it is not the time-out, the process returns to the preceding step S3017 (FIG. 30). However, in a case that the time-out occurs, the process writes "failure" in the connection result variable in the step S3007 in FIG. 30, and then, returns.

When "YES" is determined in the step S3029, that is, its own number (CID) is present in the entry slot position of the U slot of the received parent device packet, after incrementing (+1) the actual number of allotted slots n in a succeeding step S3033, in a step S3035, it is determined whether or not the actual number of allotted slots n becomes equal to the maximum number of slots N to be allotted to one child device (that is, this N changes depending on a game. A value of 1-4, for example). When "NO" is determined in this step S3035, that is, when it is still possible to allotted the slot, the process returns to the preceding step S3025 so as to receive the parent device packet.

However, if "YES" is determined in the step S3025, assuming that as many slots as possible are assigned, in a succeeding step S3037, "success" is registered in the connection result variable, and the process advances to a succeeding step S3039. In this step S3039, the parent device number PID of the connected parent device and the acquired slot number are stored in the area 88 of the internal RAM 28 of the user's own apparatus (FIG. 18). However, there is a case that the slot number is plural, and in this embodiment, the numerical value is any one of "0"-"3". Next, the process returns to the step S85 in FIG. 24, later.

In the step S85, it is determined whether or not the connection result is "success" by referring to the connection result variable of the area 88. Then, in a case of "NO", in a succeeding step S87, a message such as "not connected", for example, is displayed on the LCD 18 of the parent device (FIG. 1), and then, the process returns to the step S7.

In a case that the connection to the parent device is successful, in a succeeding step S89, the processor 20 of the child device, toward the parent device, uses the parent device slot allotted to the user's own apparatus so as to transmit the user name and the game name of the user's own apparatus. Next, in a step S91, it is determined whether or not to start the game, that is, it is determined whether or not the start button included in the operation key 38 is depressed. If it is detected that the start button is turned-on in this step S91, in a succeeding step S93, the transmission/reception process of the child device is executed.

Figure 24:
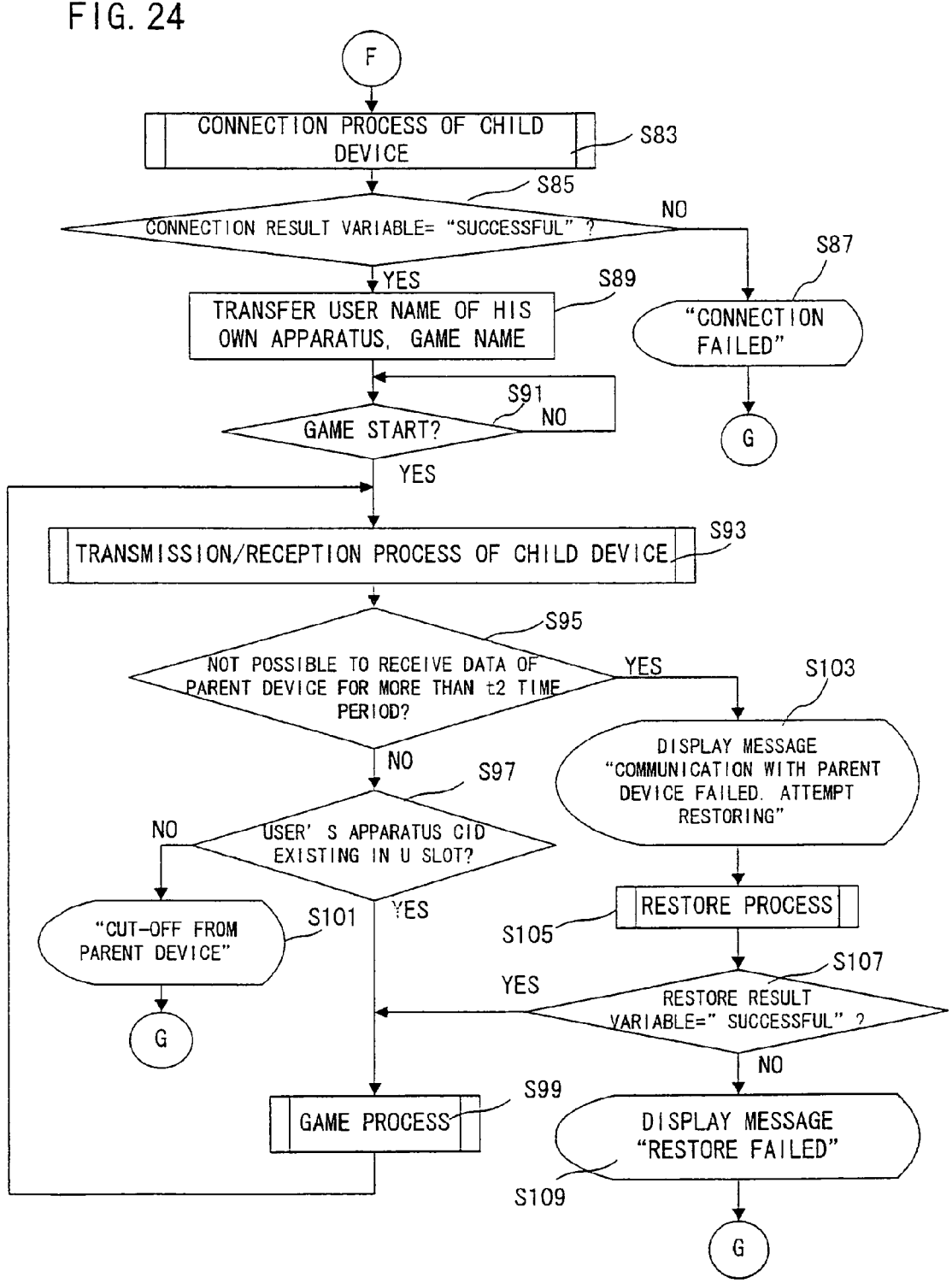
FIG. 24 is a flowchart showing a succeeding part of FIG. 21.
Figure 32:
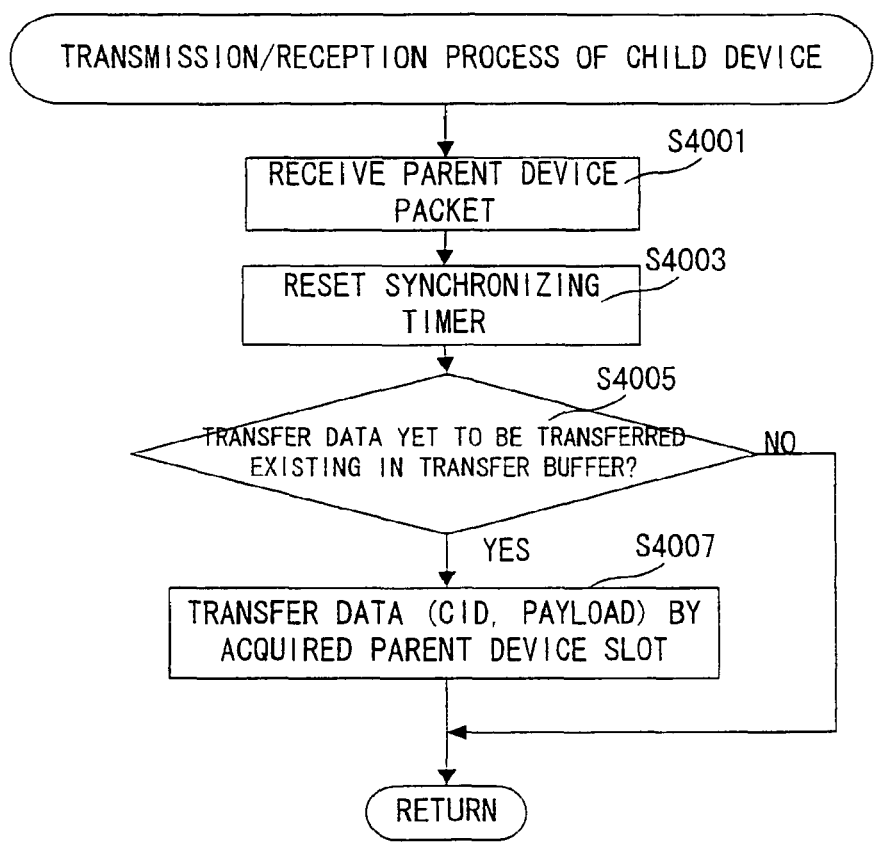
FIG. 32 is a flowchart showing an operation of a transmission/reception process of the child device.

The transmission/reception process of the child device shown in the step S93 in FIG. 24 is described in detail in FIG. 32. The parent device packet is received in a step S4001 in FIG. 32, and in a succeeding step S4003, the synchronizing timer (FIG. 18) is reset. Next, in a step S4005, the processor 20 of the parent device determines whether or not there is the transmitting data yet to be transmitted in the transmission buffer 92 (FIG. 18). If "YES", in a succeeding step S4007, using the parent device slot already assigned, the necessary data such as the CID, the payload, for example, is transmitted. Then, in a case that there is no data yet to be transmitted, or after the step S4007, the process returns to the step S95 in FIG. 24.

Returning to FIG. 24 once again, in the step S95, the processor 20 of the child device determines whether or not the data is not successfully received from the parent device for more than a time period t2. The time period t2 is shorter than the time period t1 in the step S43 in the preceding FIG. 22. That is, t1 is >t2. This is because t1 is a time period for cutting-off the child device having an abnormal communication, and t2 is a time period that the parent device starts a restoring process, and it is necessary for the parent device to wait for the restoring process of the parent device, and then cut-off. In a case of "NO", in addition, in a succeeding step S97, it is determined whether or not its own number CID is included in the U slot field of the received parent device packet. In a case of "YES" in the step S97, in a step S99, the game process in FIG. 22 is executed. It is noted that in a case of "NO" in the step S97, that is, in a case that the number of the user's own apparatus is not present in the U slot field of the parent device packet, in a step S101, a message such as "cut-off from the parent device", for example, is displayed on the LCD, and the process returns to the step S7 in FIG. 20.

When "YES" is determined in the preceding step S95, that is, no data has been successfully received from the parent device for more than the predetermined time period t2, in a step S103, a message such as "not communicable with the parent device. Try to restore", for example, is displayed, and after this, in a step S105, a restoring process is executed.

Figure 33:
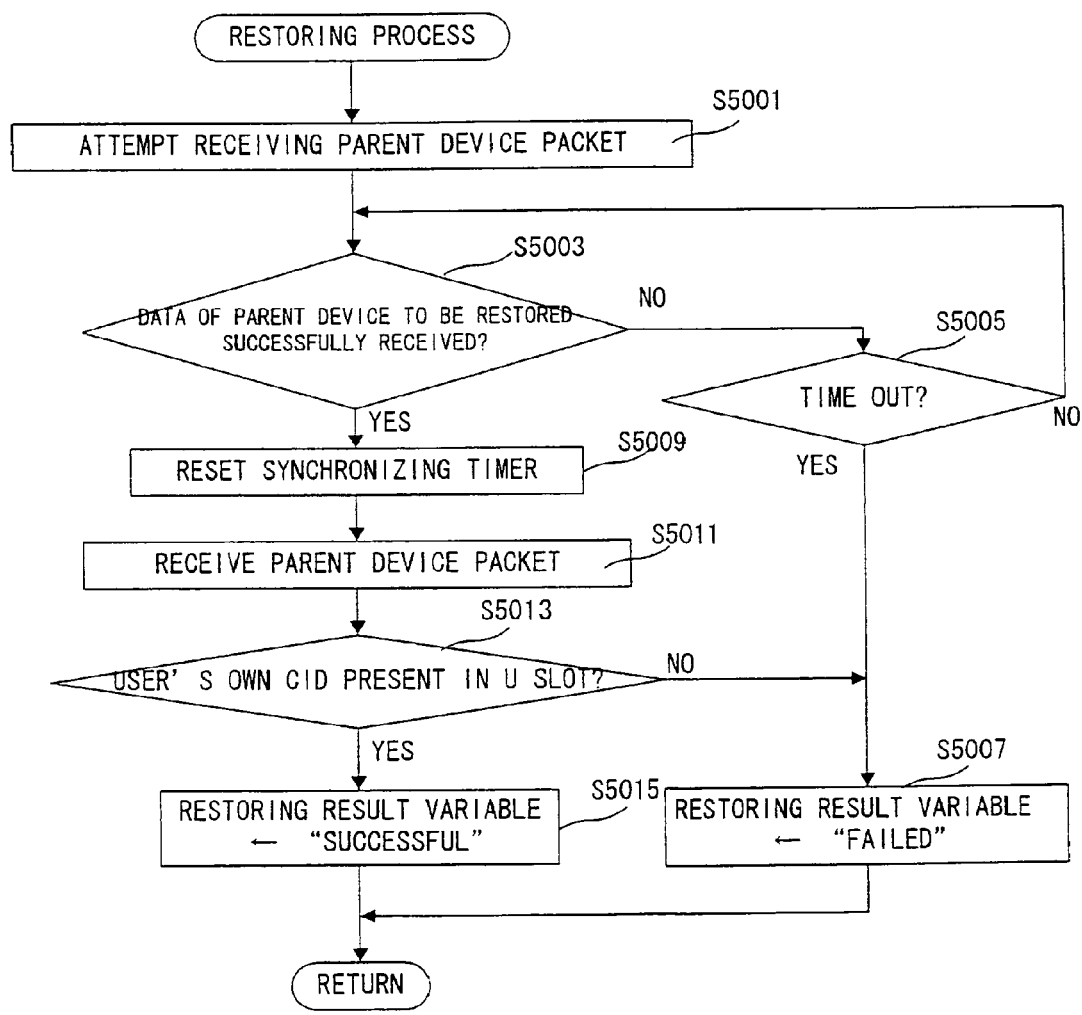
FIG. 33 is a flowchart showing an operation of a restoring process of the child device.

This restoring process is displayed in detail in FIG. 33, and in a step S5001, which is a first step in FIG. 33, the processor 20 of the parent device attempts to receive the child device to be restored. Next, in a step S5003, it is determined whether or not it has been successful to receive the broadcasting data from the parent device. It is noted that whether or not the parent device at that time is a parent device to which the user's own apparatus is to be restored is understood by looking at the "connection-destination PID" registered in the area 88 in FIG. 18.

When "NO" is determined in the step S5003, that is, when it is not successful to receive the data of the parent device packet which the user's own apparatus is to be restored, in a succeeding step S5005, it is determined whether or not it is time-out. Then, if "NO", the process returns to the preceding step S5003, and however, if it is time-out, in a succeeding step S5007, the process writes "failure" in the restoring result variable included in the area 88 shown in FIG. 18, and then, returns.

When "YES" is determined in the preceding step S5003, that is, when it is successful to receive the parent device packet from the subject parent device, the synchronizing timer is reset in a succeeding step S5009, and furthermore, in a step S5011, the parent device packet is received. Then, in a step S5013, it is determined whether or not its own number CID is present in the U slot field of the parent device packet. That the number of the user's own apparatus is present in the received parent device packet means that the reason of a state of the communication failure for more than the time period t2 is not an intentional cutting-off by the parent device, and therefore, in a succeeding step S5015, the process registers "success" in the restoring result variable of the area 88 (FIG. 18), and then, returns. As a result of this restoring process thus being made, in a case that the parent device and the child device deviates from the communicable range in error, that no communication is established due to a poor communication state, or that the player operating the child device comes across a certain private duty, and the child device player needs to deviate from the communicable range for a short period of time, after such the causes are dissolved so that the communicable state is reestablished, it is possible to return to a prior communication state.

It is noted that even if "YES" is determined in the step S5003, if "NO" is determined in the step S5013, the process returns via the preceding step S5007, assuming that the communication cuffing-off results from an intentions of the parent device.

Returning from a subroutine in FIG. 33 to the step S107 in FIG. 24, in this step S107, by referring to the restoring result variable of the area 88, it is determined whether or not the restoring is "success". If "YES", the proves advances to a step S99 so as to execute the game process. However, if "NO", in a step S109, after displaying a message such as "not possible to return", for example, the process returns to the step S7 in FIG. 20.

The above-described is a case that the cartridge not applicable to the OC mode is attached to the user's own apparatus, and the process of the mobile game apparatus in a case that the user's own apparatus becomes the child device.

Next, descriptions will be made regarding a process of the mobile game apparatus in a case that the cartridge is not attached to the user's own apparatus. However, in this case, the user's own apparatus can merely operate as the child device of the game corresponding to the OC mode.

Returning to FIG. 19, "NO" is determined in the step S3, that is, in a case of detecting that the parent device does not have the cartridge, in a step S111, which is a program of the boot ROM (24 in FIG. 1), an OCD program (program for downloading the child device-use program from the parent device) set to the ROM 52 of the wireless communication unit 14 (FIG. 1) is developed into the WRAM 28 included in the processor 20 of the mobile game machine 12, and in a step S113, later, the processor 20 of the child device starts the OCD program developed on the WRAM 28.

Figure 25:
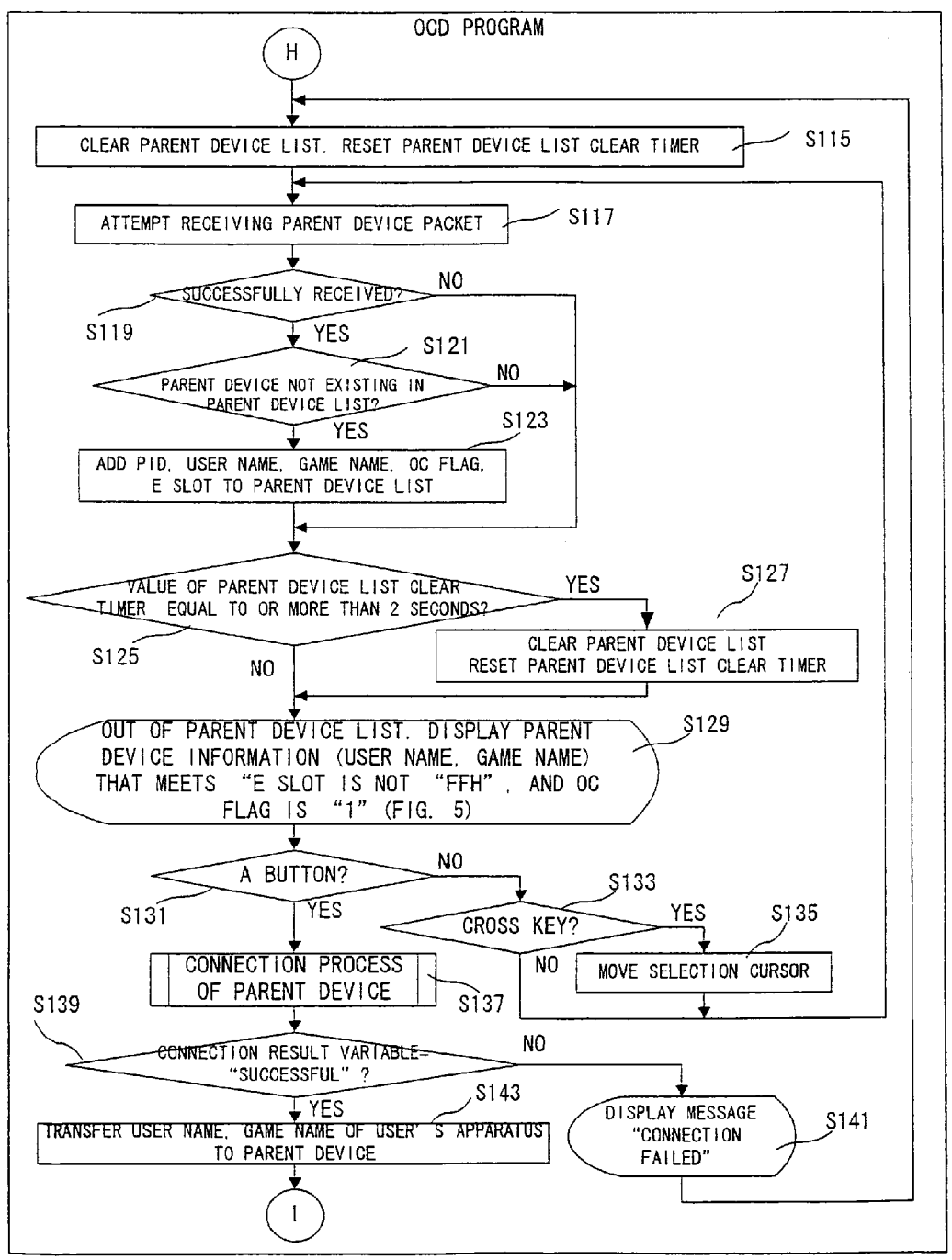
FIG. 25 is a flowchart showing a succeeding part of FIG. 19.

Subsequently, in a step S115 in FIG. 25, the processor 20 of the child device clears the parent device list area 80 as shown in FIG. 18, and resets the parent device list clear timer 82. Next, in a step S117, it is attempted to receive the parent device packet. Then, in a step S119, it is determined whether or not successful to receive the parent device, if "NO", the process advances to a step S125, and if "YES", the process advances to a step S121. In the step S121, by comparing the parent device number PID included in the received parent device packet and the number PID registered in the parent device list area 80 shown in FIG. 18, it is determined whether or not the parent device that transmitted the parent device packet is included is not present within the parent device list. If "YES" is determined in this step S121, in a step S123, similar to registering a new parent device to the parent device list, the new unit number PID, the user name, the game name, the OC flag, and the E slot read-out from the parent device packet are added to the parent device list area 80. Subsequently, the process advances to the step S125.

In the step S125, it is determined whether or not a value of the parent device clear timer 82 reset in the step S115 becomes equal to or more than "2 seconds". If "YES", the parent device list, that is, the parent device list area 80, is cleared in a step S127, and the parent device list clear timer 82 is reset. Subsequently, the process advances to a step S127 similar to a case that "NO" is determined in the step S125.

Figure 5:
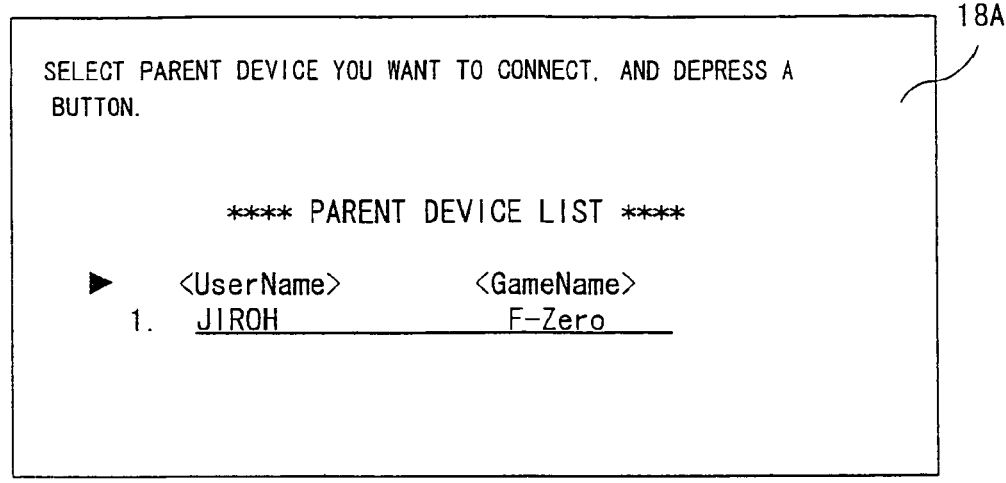
FIG. 5 is an illustrative view showing an example of a display screen showing only the parent device present around the user's own apparatus and capable of playing a game in an OC (one cartridge) mode, in the FIG. 2 embodiment.

In the step S127, of the parent device list, the parent device having the E slot not "ffh" and the OC flag "1", that is, information (user name, game name) of the parent device capable of playing the game in the OC mode, and that does not refuse a participation (entry) of the child device is displayed. This creates, to the user of the child device, a parent device list 18A as shown in FIG. 5, and allows the user's own apparatus to select the parent device. Next, in a step S131, it is determined whether or not the A button (not shown) is operated. That is, it is determined that any one of the parent devices is selected. If "NO" in the step S127, that is, the parent device is not selected, in a succeeding step S133, it is determined whether or not the cross key (not shown) included in the operation key 38 is operated. The operating of the cross key is for moving the cursor for selecting the parent device that intends the entry, and therefore, if "YES" in this step S133, in a succeeding step S135, the cursor is moved, and the process returns to the step S113.

If "YES" is determined in the step S131, the process advances to a step S139 so as to execute a connection process of the child device (FIG. 30, FIG. 31).

In a step S137, according to the method already described in detail, the connection process of the child device is executed, and in the succeeding step S139, by referring to the connection result variable of the area 88 in FIG. 18, it is determined whether or not the connection is successful. If "NO", a message such as "connection failed", for example, is displayed in a step S141, and the process returns to the step S111.

If "YES" is determined in the step S139, the processor 20 transmits toward the parent device that successfully made the connection with the child device the user name of the parent device, and the game name. Subsequently, the process advances to a step S145 in FIG. 26 so as to, for playing the game in the OC mode, receive a transfer-use child device program from the parent device, develop the same within the RAM 28 (FIG. 1) of the user's own apparatus, and starts the program. Then, subsequently, in a step S147, the respective steps similar to the steps S91-S109 in FIG. 24 described earlier are executed.

The above is a process of the mobile game apparatus in a case that the cartridge is not attached to the user's own apparatus.

It is noted that if "NO" is determined in the step S81 in FIG. 21, that is, in a case that although it is attempted to select the parent device, failed to make the communication, in a step S149, a message such as "the parent device cannot be selected", for example, is displayed, and the process returns to the step S9 in FIG. 20.

In addition, if "NO" is determined in the step S79 in FIG. 21, that is, in a case neither the B button nor the A button is operated, it is determined whether or not the cross key (not shown) is operated in a succeeding step S151. If "NO", it is determined whether or not the start key (not shown) is operated in a succeeding step S153. In a case that the start key is not operated, the process returns to the step S9 in FIG. 20. In a case that "YES" is determined in the step S153, in the step S153, after changing on/off of the all-display flag, similarly, the process returns to the step S9 (that is, the select key is used for controlling the on/off of the all-display flag). It is noted that in a case that "YES" is determined in the step S151, after moving the cursor according to an instruction of the cross key, the process returns to the step S9.

Figure 34:
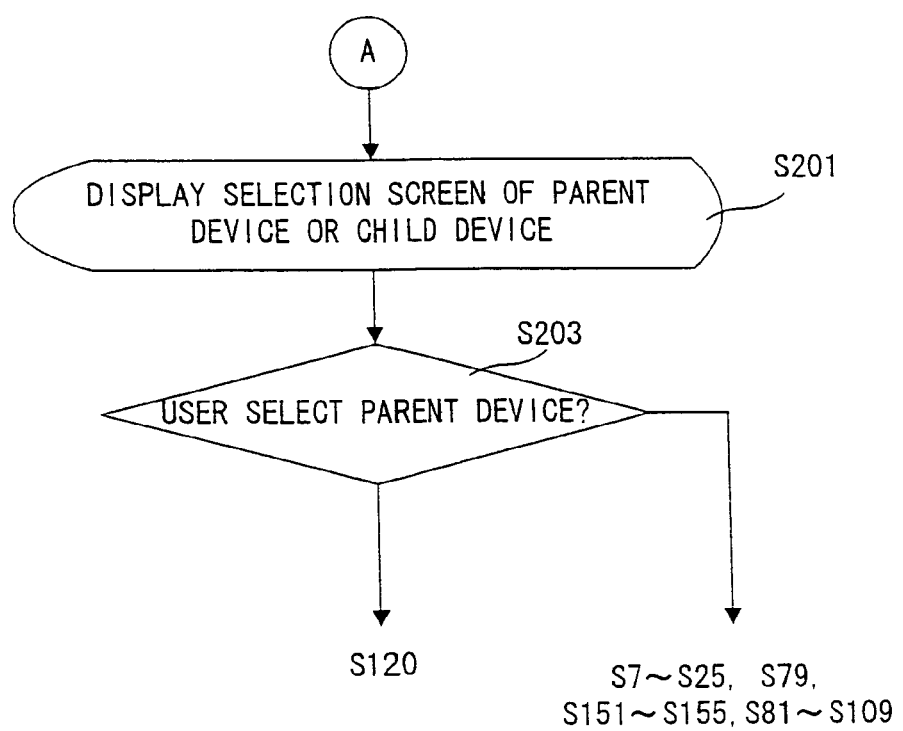
FIG. 34 is a flowchart showing a major portion of an embodiment in which a selection is made as to whether the user's own apparatus is rendered the parent device or the child device in the first place.

It is noted that in the above embodiment, it is selected whether the user's own apparatus is rendered the parent device or the child device, in tune with progress of the program. However, it may be possible that such the selection is immediately made. In this case, as shown in FIG. 34, in a step S201, which is a first step immediately after the start, a selection screen (not shown) of the parent device or the child device is displayed, and the according to the display, the user selects the parent device or the child device. Therefore, the processor 20, in a succeeding step S203, determines whether or not the user has selected the parent device. In a case of "YES" in the step S203, after this, the steps that follow the step S29 in the preceding FIG. 21 are executed. In a case of "NO", that is, in a case that the child device is selected, the steps S7-S25, S79, S151-S157, and S81-S109 shown in FIG. 21 are executed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information system including a plurality of devices, wherein:
   at least one of the devices includes:
      a wireless transmitter configured to wirelessly send self-identifying information and application identifying information identifying an application which is being executed on the respective device, wherein the wireless transmitter is further configured to send the self-identifying information and the application identifying information before the respective device has established a connection with any other devices, and
   at least one other of the devices includes:
      a wireless receiver configured to wirelessly receive, from the plurality of devices existing within a communication range, said self-identifying information and said application identifying information from said wireless transmitter, and
   at least one processor configured to:
      generate a display of indications of devices existing within the communications range that are communicative with an application which is being executed on the other of the devices, based on the application identifying information received by said wireless receiver,
      allow a user to select at least one of the devices displayed, and
      cause transmission of a connection request toward the selected at least one device.

2. A wireless communication system including a plurality of mobile devices, wherein
   each said device in the system is configured to:
      send information identifying the respective device and information identifying an application being run on the respective device, wherein the self-identifying information and the application identifying information is sent before the respective device has established a connection with any other devices,
      receive information identifying other devices that are in communications range therewith, as well as information identifying which applications are being run on those other devices,
      display the devices existing within the communication range, based on the received information,
      enable a user to select at least one of the devices existing within the communication range following the displaying, and
      transmit a connection request to the selected at least one device, and
   wherein the devices that are displayed on a given device are those that are running applications suitable for communicating with the application being run by the given device, as determined by the given device in consultation with the application identifying information received by the given device.

3. A wireless handheld device comprising:
   a wireless transmitter configured to wirelessly send self-identifying information and application identifying information identifying at least one application on the device, wherein the wireless transmitter is further configured to send the self-identifying information and the application identifying information before the device has established a connection with any other devices,
   a wireless receiver configured to wirelessly receive self-identifying information and application identifying information from other devices, and at least one processor configured to:
generate a display of indications of other devices existing within a communications range that are communicative with an application on the device based on the application identifying information received by the wireless receiver, wherein established connections are not prerequisites to generation of the display,
allow a user to select at least one of the displayed other devices, and
cooperate with the wireless transmitter to transmit a connection request toward the selected other device(s).

4. The device of claim 3, wherein the device is a game device, and the at least one application comprises a communicative game.

5. The device of claim 3, wherein the application identifying information identifies an application which is being executed on the device.

6. The device of claim 3, wherein the application identifying information identifies an application which is being activated on the device.

7. The device of claim 3, wherein the application identifying information identifies an application which has already been executed but has not started a communicative state in the application with any other devices.

8. The device of claim 3, wherein the wireless transmitter and the wireless receiver are implemented in a wireless transceiver.

9. A wireless handheld device comprising:
a wireless transmitter configured to wirelessly send self-identifying information and application identifying information identifying at least one application on the device, wherein the wireless transmitter is further configured to send the self-identifying information and the application identifying information before the device has started a communicative state with any other devices,
a wireless receiver configured to wirelessly receive self-identifying information and application identifying information from other wireless devices, and
at least one processor configured to:
generate a display of indications of other devices existing within a communications range that are communicative with an application on the device based on the application identifying information received by the wireless receiver, wherein established connections are not prerequisites to generation of the display,
allow a user to select at least one of the displayed wireless devices, and
cooperate with the wireless transmitter to transmit a connection request toward the selected wireless device(s).

10. The device of claim 3, wherein the wireless transmitter is further configured to send the self-identifying information and the application identifying information before any opponent to connect with has been determined.

11. The device of claim 3, wherein the wireless transmitter is further configured to send the self-identifying information and the application identifying information before the user has selected any opponent to connect with.

12. The device of claim 3, wherein the wireless transmitter is further configured to send the self-identifying information and the application identifying information to at least two devices within communications range.

13. The device of claim 3, wherein the wireless transmitter is further configured to send the self-identifying information and the application identifying information so that undetermined other devices within communications range can get them.

14. The device of claim 3, wherein the wireless transmitter and the wireless receiver are further configured to send and receive said information among unspecified devices.

15. The device of claim 14, wherein the application identifying information identifies an application which is being executed thereon.

16. The device of claim 3, wherein the wireless transmitter is further configured to send the self-identifying information and the application identifying information on the device for a plurality of other devices without establishing a connection with the other devices.

17. The device of claim 3, wherein the at least one processor is further configured to execute communication information processing with another device.

18. The device of claim 9, wherein the wireless transmitter and the wireless receiver are implemented in a wireless transceiver.

19. A wireless handheld device comprising:
a wireless transmitter configured to wirelessly send self-identifying information and application identifying information identifying at least one application on the device,
a wireless receiver configured to wirelessly receive self-identifying information and application identifying information from other wireless devices, and
at least one processor configured to:
generate a display of indications of other devices existing within a communications range that are communicative with an application on the device based on the application identifying information received by the wireless receiver,
allow a user to select at least one of the displayed wireless devices, and
cooperate with the wireless transmitter to transmit a connection request toward the selected wireless device(s),
wherein the application identifying information identifies an application which has already been executed but has not started a communicative state in the application with any other devices.

20. The device of claim 19, wherein the wireless transmitter and the wireless receiver are implemented in a wireless transceiver.

21. At least one non-transitory computer readable storage medium tangibly storing program instructions executable by at least one processor of a wireless information device in an information system including a plurality of wireless information devices, the instructions configured to cause the wireless information device in the information system to at least:
wirelessly send self-identifying information and application identifying information identifying an application on the device, wherein the self-identifying information and the application identifying information is sent before that device has established a connection with any other devices,
wirelessly receive self-identifying information and application identifying information,
display indications of devices existing within the communication range that are communicative with an application on the device, without having to establish connections with any other devices, and based on said information received, allow a user to select at least one of the devices displayed, and transmit a connection request toward the selected at least one device.

22. At least one non-transitory computer readable storage medium tangibly storing program instructions for use with a mobile device, the program instructions configured to cause the mobile device to at least:

send information identifying the device and information identifying an application being run on the device, wherein the information identifying the device and the information identifying the application being run on the device is sent before the device has established a connection with any other devices, receive information identifying other devices that are in communications range, as well as information identifying which applications are running on those other devices, display the devices existing within the communications range, based on the received information, enable a user to select at least one of the devices existing within the communications range following the displaying, and transmit a connection request to the selected device(s), and wherein the devices that are displayed on a given device are those that are running applications suitable for communicating with the application being run by the given device, as determined by the given device in consultation with the application identifying information received by the given device.

23. At least one non-transitory computer readable storage medium storing program instructions for execution by at least one processor of a wireless handheld information display device, the instructions causing the at least one processor to provide operations that at least:

wirelessly send self-identifying information and application identifying information identifying at least one application on the device, wherein the self-identifying information and the application identifying information is sent before the device has established a connection with any other devices, wirelessly receive self-identifying information and application identifying information from at least one other wireless device, display indications of other wireless devices existing within a communications range that are communicative with an application on the wireless handheld information display device, wherein established connections are not prerequisites to generation of the display, allow a user to select at least one of the displayed wireless devices, and transmit a connection request toward the selected wireless device(s).

24. A wireless handheld game device comprising:

a wireless transmitter configured to wirelessly send self-identifying information and application identifying information identifying at least one application on the game device, wherein the wireless transmitter is further configured to send the self-identifying information and the application identifying information before the device has established a connection with any other devices, a wireless receiver configured to wirelessly receive self-identifying information and application identifying information from other game devices, and at least one processor configured to:

generate a display of indications of other game devices existing within a communications range that are communicative with an application on the wireless handheld game device based on the application identifying information received by the wireless receiver, wherein established connections are not prerequisites to generation of the display, allow a user to select at least one of the displayed wireless game devices, and cooperate with the wireless transmitter to transmit a connection request toward the selected wireless game device(s).

25. The device of claim 24, wherein the wireless transmitter and the wireless receiver are implemented in a wireless transceiver.

26. A wireless handheld device comprising:

a wireless transmitter configured to wirelessly send self-identifying information and application identifying information identifying at least one application on the device, a wireless receiver configured to wirelessly receive self-identifying information and application identifying information from other devices, and at least one processor configured to:

generate a display of indications of other devices that are communicative with an application on the wireless handheld device based on the application identifying information received by the wireless receiver, allow a user to select at least one of the displayed wireless devices, and cooperate with the wireless transmitter to transmit a connection request toward the selected wireless device(s), wherein the wireless transmitter is further configured to send the self-identifying information and application identifying information, and generate the display, when the device has not yet established a connection with any other devices.

27. The device of claim 26, wherein the wireless transmitter and the wireless receiver are implemented in a wireless transceiver.

28. A wireless handheld device comprising:

a wireless transmitter configured to wirelessly send self-identifying information and application identifying information identifying at least one application on the device, a wireless receiver configured to wirelessly receive self-identifying information and application identifying information from other devices, and at least one processor configured to:

generate a display of indications of other devices that are communicative with an application on the wireless handheld device based on the application identifying information received by the wireless receiver, allow a user to select at least one of the displayed wireless devices, and cooperate with the wireless transmitter to transmit a connection request toward the selected wireless device(s), wherein the wireless transmitter is further configured to send the self-identifying information and application identifying information, and generate the display, when any opponent to connect with is not yet determined.

29. The device of claim 28, wherein the wireless transmitter and the wireless receiver are implemented in a wireless transceiver.

30. A wireless handheld device comprising:
a wireless transmitter configured to wirelessly send self-identifying information and application identifying information identifying at least one application on the device,
a wireless receiver configured to wirelessly receive self-identifying information and application identifying information from other devices, and
at least one processor configured to:
generate a display of indications of other devices when the other devices' application identifying information identifies a predetermined application, wherein established connections are not prerequisites to generation of the display,
allow a user to select at least one of the displayed wireless devices, and
cooperate with the wireless transmitter to transmit a connection request toward the selected wireless device(s).

31. The device of claim 30, wherein the wireless transmitter and the wireless receiver are implemented in a wireless transceiver.

32. A wireless handheld device comprising:
a wireless transmitter configured to wirelessly send self-identifying information and application identifying information, wherein the wireless transmitter is further configured to send the self-identifying information and the application identifying information before the device has established a connection with any other wireless devices,
a wireless receiver configured to wirelessly receive self-identifying information and application identifying information from other wireless devices, and
at least one processor configured to:
generate a display of indications of other devices that are communicative with an application on the device based on the application identifying information received by the wireless receiver, wherein established connections are not prerequisites to generation of the display,
allow a user to select at least one of the displayed wireless devices, and
cooperate with the wireless transmitter to transmit a connection request toward the selected wireless device(s).

33. The device of claim 32, wherein the application identifying information identifies an application on the device.

34. The device of claim 32, wherein the application identifying information identifies an application being executed on the device.

35. The device of claim 32, wherein the application identifying information identifies an application being activated on the device.

36. The device of claim 32, wherein the wireless transmitter and the wireless receiver are implemented in a wireless transceiver.

37. An information system including a plurality of devices, wherein:
at least one of the devices includes:
a wireless transmitter configured to wirelessly send self-identifying information and application identifying information identifying an application which is being executed on the respective device, wherein the wireless transmitter is further configured to send the self-identifying information and the application identifying information without the respective device establishing a connection with any other devices,
at least one other of the devices includes:
a wireless receiver configured to wirelessly receive, from the plurality of devices, said self-identifying information and said application identifying information from said wireless transmitter, and
at least one processor configured to:
generate a display of indications of devices that are communicative with an application which is being executed on the other of the devices, based on the application identifying information received by said wireless receiver,
allow a user to select at least one of the devices displayed, and
cause transmission of a connection request toward the selected at least one device.

38. A wireless handheld device comprising:
a wireless transmitter configured to wirelessly send self-identifying information and application identifying information identifying at least one application on the device, wherein the wireless transmitter is further configured to send the self-identifying information and the application identifying information without the device establishing a connection with any other devices,
a wireless receiver configured to wirelessly receive self-identifying information and application identifying information from other devices, and
at least one processor configured to:
generate a display of indications of other devices that are communicative with an application on the device based on the application identifying information received by the wireless receiver, without having to establish connections with any other devices,
allow a user to select at least one of the displayed other devices, and
cooperate with the wireless transmitter to transmit a connection request toward the selected other device(s).

39. The device of claim 38, wherein the wireless transmitter and the wireless receiver are implemented in a wireless transceiver.

40. A wireless handheld device comprising:
a wireless transmitter configured to wirelessly send self-identifying information and application identifying information identifying at least one application on the device, wherein the wireless transmitter is further configured to send the self-identifying information and the application identifying information without the device establishing a connection with any other devices,
a wireless receiver configured to wirelessly receive self-identifying information and application identifying information from other devices, and
at least one processor configured to:
generate a display of indications of other devices that are communicative with an application on the wireless handheld device based on the application identifying information received by the wireless receiver, without having to establish connections with any other devices,
allow a user to select at least one of the displayed wireless devices, and
cooperate with the wireless transmitter to transmit a connection request toward the selected wireless device(s).

41. The device of claim 40, wherein the wireless transmitter and the wireless receiver are implemented in a wireless transceiver.

42. A wireless device comprising:
- a wireless receiver configured to wirelessly receive, from at least one other unspecified device, self-identifying information of the unspecified device and application identifying information identifying at least one application being executable on the unspecified device; and
- at least one processor configured to:
  - extract devices that are communicative with the wireless device using the application identifying information received by said wireless receiver and generate a display of indications of the extracted devices without having to establish connections with any other devices;
  - allow a user to select at least one of the devices displayed; and
  - cause transmission of a connection request toward the selected at least one device.

43. The device of claim 42, wherein the wireless receiver is implemented in a wireless transceiver.

* * * * *